US009658630B2

(12) United States Patent
Hashimoto

(10) Patent No.: US 9,658,630 B2
(45) Date of Patent: May 23, 2017

(54) DIGITAL FILTER AND TIMING SIGNAL GENERATION CIRCUIT

(71) Applicant: FUJITSU LIMITED, Kawasaki-shi, Kanagawa (JP)

(72) Inventor: Tetsutaro Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/634,354

(22) Filed: Feb. 27, 2015

(65) Prior Publication Data

US 2015/0268679 A1 Sep. 24, 2015

(30) Foreign Application Priority Data

Mar. 19, 2014 (JP) ................................. 2014-057034

(51) Int. Cl.
*H04B 1/10* (2006.01)
*G05F 1/46* (2006.01)

(52) U.S. Cl.
CPC ..................................... *G05F 1/46* (2013.01)

(58) Field of Classification Search
CPC ......................................................... G05F 1/46
See application file for complete search history.

(56) References Cited

U.S. PATENT DOCUMENTS 7,747,972 B2 * 6/2010 Mirbeth .............. G06F 17/5031 716/113
8,222,936 B2 7/2012 Friedman et al.
2001/0024454 A1 * 9/2001 Hasegawa ......... H04L 25/03006 370/503
2005/0047040 A1 3/2005 Naffziger
2010/0061722 A1 * 3/2010 Hashiguchi ............. H04L 41/12 398/26
2013/0100811 A1 * 4/2013 Watanabe .......... H04N 21/6437 370/235

FOREIGN PATENT DOCUMENTS

JP 2005-102197 A 4/2005
JP 2008-099163 A 4/2008

OTHER PUBLICATIONS

Lefurgy, Charles R., et al., "Active Management of Timing Guardband to Save Energy in POWER7", MICRO 44, pp. 1-11, Dec. 3-7, 2011.

* cited by examiner

*Primary Examiner* — Shuwang Liu
*Assistant Examiner* — Gina McKie
(74) *Attorney, Agent, or Firm* — Arent Fox LLP

(57) ABSTRACT

A digital filter includes: a minimum-value holder that holds a minimum value of a measurement value inputted in the minimum-value holder and that outputs the minimum value as a held value; a limit-value circuit that receives the held value and that outputs the held value as a limit value in a case where the held value remains minimum during predetermined cycles; and an output controller that receives a maximum value, the measurement value, and the limit value, the maximum value defining an upper limit, outputs the measurement value as an output value if the measurement value is smaller than the limit value, and outputs the maximum value as the output value if the measurement value is equal to or larger than the limit value.

14 Claims, 32 Drawing Sheets

[TIME CHART IN Fns≧Fck/M]

[TIME CHART IN Fck/N≦Fns<Fck/M]

[TIME CHART IN Fns≦Fck/4N]

[TIME CHART IN Fns≦Fck/4N]

[TIME CHART IN Fck/N≦Fns<Fck/M]

DIGITAL FILTER AND TIMING SIGNAL GENERATION CIRCUIT

CROSS-REFERENCE TO RELATED APPLICATION

This application is based upon and claims the benefit of priority of the prior Japanese Patent Application No. 2014-057034 filed on Mar. 19, 2014, the entire contents of which are incorporated herein by reference.

FIELD

The embodiments discussed herein are related to a digital filter and a timing signal generation circuit.

BACKGROUND

In recent years, semiconductor integrated circuits have been widely used in various devices such as electronic devices. The semiconductor integrated circuits such as processors consume power, for example, when executing a computing operation.

The power consumed by the semiconductor integrated circuit varies depending on, for example, the computing operation performed at that time. For example, also in the clock gating technique for decreasing power consumption, the consumed power considerably varies between clock-disabled time and clock-enabled time.

Current consumed by the semiconductor integrated circuit also varies in a similar manner to the consumed power. This generates di/dt noise and thus causes voltage fluctuations in the power supply wiring and the ground wiring in the semiconductor integrated circuit. Note that a semiconductor element of the semiconductor integrated circuit operates fast at a high operating voltage and slowly at a low operating voltage. If voltage fluctuations occur owing to consumed current fluctuations, the speed of the semiconductor element also fluctuates.

For example, since a semiconductor integrated circuit such as a processor operates under timing constraints defined based on a clock frequency, an occurrence of a voltage drop causes timing constraint violation, and thus an error might occur.

Under such circumstances, clock frequency control is known in which voltage fluctuations are tracked to modulate a clock frequency. In an example of proposed clock frequency control, delay deterioration attributable to the voltage fluctuations is tracked to lower the clock frequency, and the timing constraint violation is thereby avoided.

Examples of proposed technologies in the related art include a technology by which delay variation in a semiconductor element is compensated for in such a manner that supply voltage fluctuations are detected.

Another example of proposed clock frequency control methods in the related art is a method by which a change in the oscillation frequency of a ring oscillator is converted into a delay variation value to modulate, based on the amount of correction for the delay variation, a clock frequency of a phase locked loop (PLL).

However, since the method employs feedforward control, it takes time to measure the oscillation frequency of the ring oscillator, and thus only delay variation attributable to low-frequency voltage fluctuations is addressed.

Another example of the proposed clock frequency control is a method by which, based on setup slack (setup constraint margin) measured by a critical path monitor, a clock frequency of a PLL is modulated to control an amount of setup slack.

However, since this method employs feedback control, a filter is used for stabilizing a system so as to decrease a control gain and thus to delay total response. As a result, this retards a response to address a disturbance factor, and thus only delay variation attributable to low-frequency voltage fluctuations is addressed.

Meanwhile, a semiconductor integrated circuit (package containing a semiconductor chip) has a resonance frequency of, for example, tens of MHz to hundreds of MHz, and thus the voltage at a sudden consumed-current increase fluctuates in a band from tens of MHz to hundreds of MHz.

Accordingly, in the example of the clock frequency control method described above, for example, the control is not performed in time for delay variation in the resonance frequency band of the semiconductor integrated circuit package. It is thus difficult to fully compensate for the delay variation.

Further, for example, even though the clock frequency control is performed on the voltage fluctuations in the band from tens of MHz to hundreds of MHz, the frequency modulation does not track the voltage fluctuations, and thus the frequency is undesirably lowered. In other words, it is difficult to avoid a disadvantage of the clock frequency control, in voltage fluctuations in a particular frequency band.

The followings are reference documents:

[Document 1] Japanese Laid-open Patent Publication No. 2008-099163,

[Document 2] Japanese Laid-open Patent Publication No. 2005-102197,

[Document 3] U.S. Pat. No. 8,222,936, Specification; and

[Document 4] Charles R. Lefurgy et al., "*Active Management of Timing Guardband to Save Energy in POWER7 (registered trademark)*", MICRO 44, pp. 1-11, Dec. 3-7, 2011.

SUMMARY

According to an aspect of the invention, a digital filter includes: a minimum-value holder that holds a minimum value of a measurement value inputted in the minimum-value holder and that outputs the minimum value as a held value; a limit-value circuit that receives the held value and that outputs the held value as a limit value in a case where the held value remains minimum during predetermined cycles; and an output controller that receives a maximum value, the measurement value, and the limit value, the maximum value defining an upper limit, outputs the measurement value as an output value if the measurement value is smaller than the limit value, and outputs the maximum value as the output value if the measurement value is equal to or larger than the limit value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Before describing in detail a digital filter, a timing signal generation circuit, and a semiconductor integrated circuit according to embodiments discussed herein, examples of and issues regarding the timing signal generation circuit and the semiconductor integrated circuit will first be described with reference to FIGS. 1 to 8B.

Figure 1:
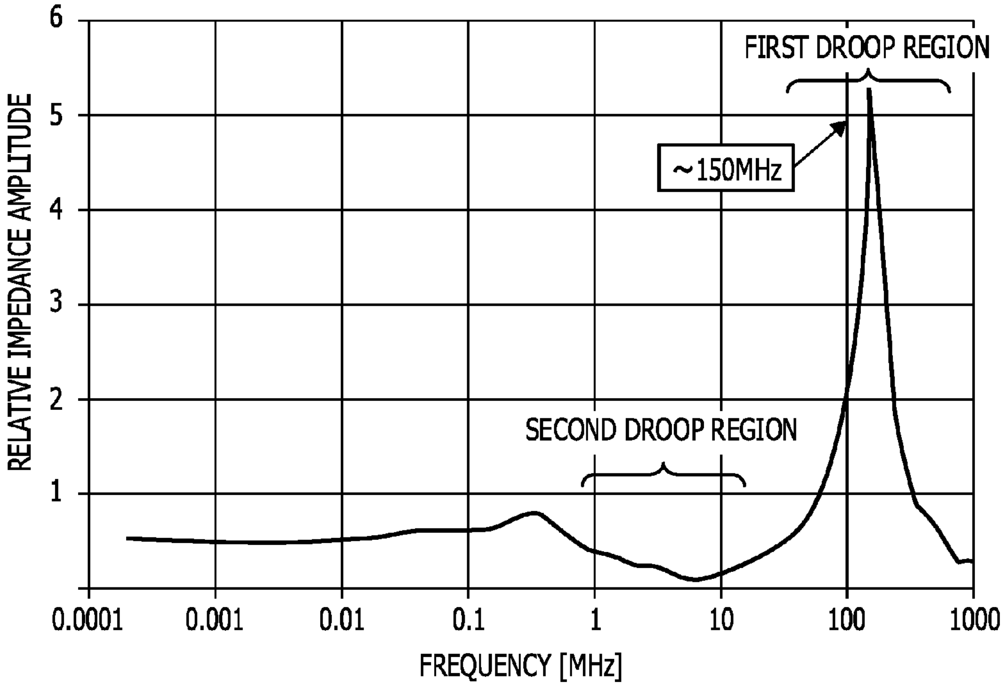
FIG. 1 is a graph illustrating an impedance characteristic of a power-supply network of a processor.
Figure 2:
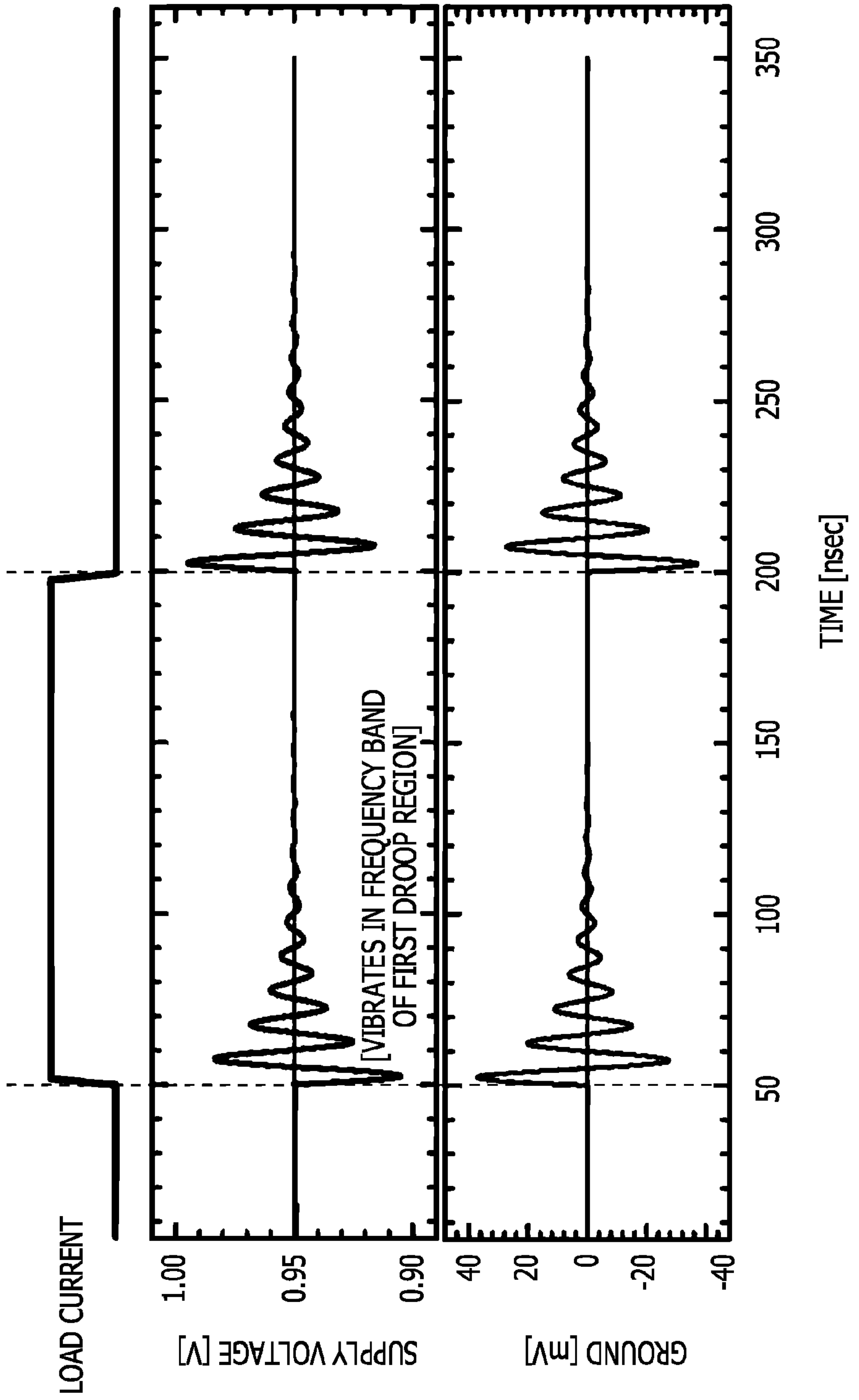
FIG. 2 is a graph for explaining first droop noise in the impedance characteristic illustrated in FIG. 1.

FIG. 1 is a graph illustrating an impedance characteristic of a processor of a power-supply network. FIG. 2 is a graph for explaining first droop noise in the impedance characteristic illustrated in FIG. 1. In FIG. 1, the horizontal axis represents frequency, while the vertical axis represents magnitude of a relative impedance.

As described above, a resonance frequency of a package of a semiconductor integrated circuit (such as a package containing a semiconductor chip such as a processor) is tens of MHz to hundreds of MHz. Accordingly, a voltage fluctuation band observed in sudden consumed-current increase is also tens of MHz to hundreds of MHz, as illustrated in FIG. 1.

As illustrated in FIG. 1, it is understood that in the impedance characteristic of the power-supply network of the processor, a first droop region (first droop noise) where the relative impedance increases is present around, for example, 150 MHz.

The presence of the first droop region is attributed to, for example, a power supply wiring pattern in a silicon chip, wiring for connecting a terminal of a silicon chip and an external terminal of a package, or the like. This defines a resonance frequency of the package.

In the impedance characteristic of the power-supply network of the processor, noise (second droop noise) in a frequency band (second droop region) from approximately 1 MHz to approximately ten of MHz is also present, the noise being attributed to, for example, mounting a semiconductor integrated circuit on a substrate.

As illustrated in FIG. 2, for example, if a load current increases in a period from 50 nsec to 200 nsec according to a computing operation of the processor, vibrations in the frequency band that is the aforementioned first droop region are observed at locations (timings) of 50 nsec and 200 nsec at which the load current changes.

The load current in the processor (consumed current) changes in the same manner as the consumed power. This causes di/dt noise, for example, at timings of 50 nsec and 200 nsec, and thus causes voltage fluctuations in the power supply wiring and the ground wiring in the semiconductor integrated circuit.

Specifically, it is understood that a ground voltage drop and a ground voltage bounce (ground voltage rise) occur at the timing of 50 nsec when the load current increases, and that a supply voltage bounce and a ground voltage drop occur at the timing of 200 nsec when the consumed current decreases. Note that the voltage and current fluctuations end with a potential (for example, 0.95V) of the supply voltage and a potential (for example, 0V) of the ground voltage after a certain time has elapsed.

Meanwhile, the semiconductor element of the semiconductor integrated circuit operates in accordance with an operating voltage using a potential difference between the power supply and the ground. The semiconductor element operates fast at a high operating voltage, and operates slowly at a low operating voltage. Accordingly, an occurrence of voltage fluctuations attributable to the consumed current leads to a variation in the speed of the semiconductor element (hereinafter, the speed variation of the semiconductor element is also referred to as delay variation).

For example, since a semiconductor integrated circuit such as a processor operates under timing constraints defined based on the clock frequency, a voltage drop and thus timing constraint violation (setup violation) occur. Accordingly, an error might occur.

An example of known methods addressing this issue is clock frequency control (adaptive frequency/supply tracking: adaptive clock-frequency control) in which voltage fluctuations are tracked to modulate a clock frequency. In the clock frequency control, for example, delay deterioration attributable to the voltage fluctuations is tracked to lower the clock frequency, and the timing constraint violation is thereby avoided.

Another example of proposed clock frequency control methods is a method by which a change in the oscillation frequency of a ring oscillator is converted into a delay variation value to modulate, based on the amount of correction for the delay variation, a clock frequency of a PLL.

FIGS. 3 to 5B are a diagram and graphs for explaining the clock frequency control of the first droop noise, and illustrate effects on the timing, the effects being obtained by applying the clock frequency control to the power supply noise (first droop noise) described with reference to FIG. 2.

Here, a control delay is denoted by Td, a voltage-fluctuation frequency (power supply noise: first droop noise) is denoted by Fns, and a cycle of the power supply noise is denoted by Tns. Unless $Td \leq Tns/8$ holds true, the frequency modulation is not performed in time. In the frequency Fns of the power supply noise in FIG. 2, $Fns=1/Tns \leq 1/(8Td)$ holds true, and thus the clock frequency control exerts its effects at this time.

Figure 3:
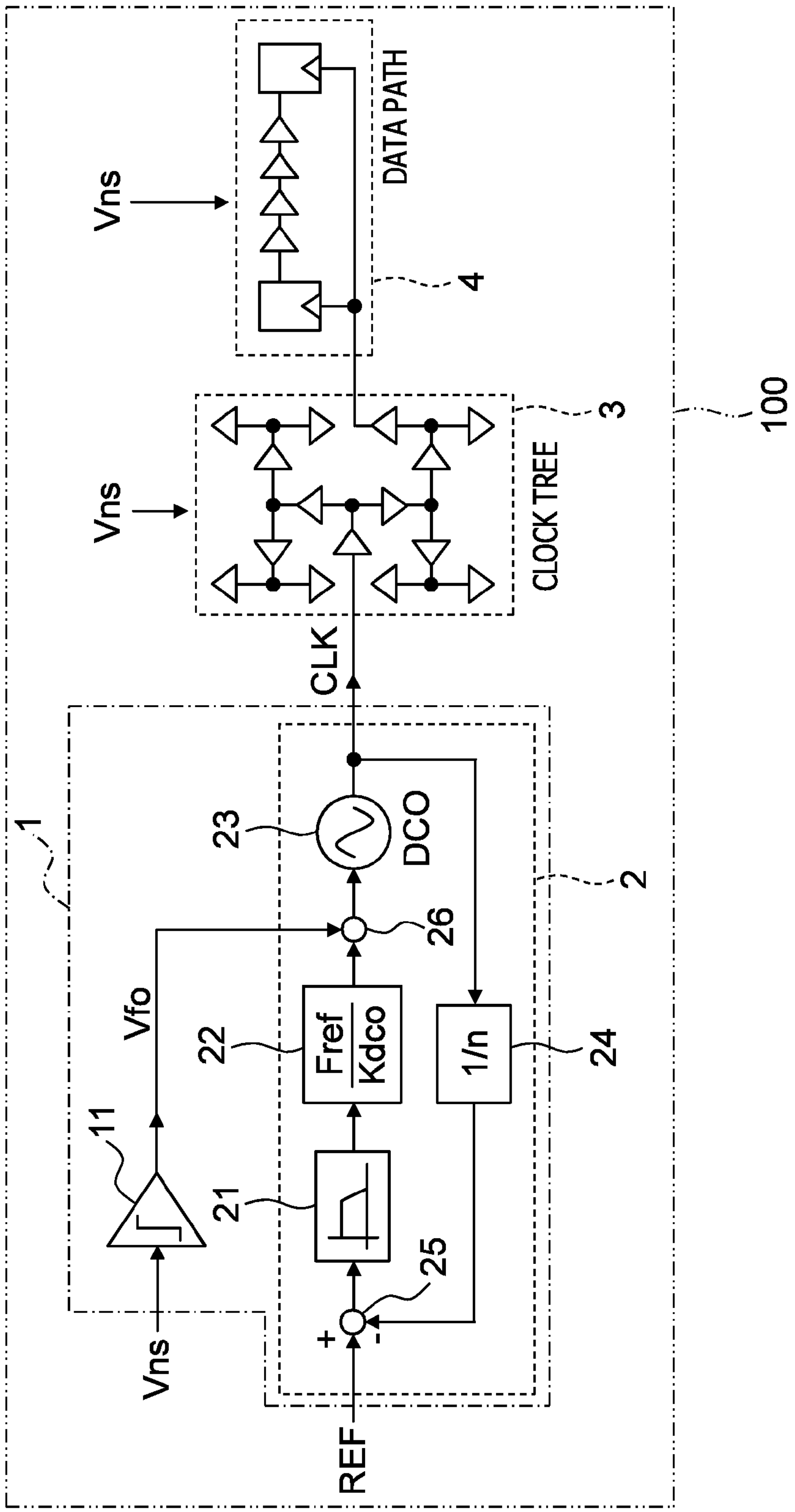
FIG. 3 is a diagram (1/3) for explaining clock frequency control on the first droop noise.

FIG. 3 illustrates an example of the semiconductor integrated circuit including a semiconductor chip 100. The semiconductor chip 100 includes a timing-signal generation circuit 1, a clock tree 3, and a data path 4. The timing-signal generation circuit 1 generates a timing signal (clock CLK), and includes a voltage-fluctuation observer 11 and a PLL 2.

The PLL 2 includes a loop filter 21, a gain normalizer 22, a digital controlled oscillator (DCO) 23, a divider 24, a subtractor 25, and an adder 26.

The subtractor 25 subtracts the phase of output from the divider 24 from the phase of output from a reference signal REF received from outside, and outputs the result to the loop filter 21. To avoid oscillation generated owing to amplified short-cycle signal fluctuations, the loop filter 21 cuts off undesirable short-cycle fluctuations from the output from the subtractor 25, and outputs the result to the gain normalizer 22.

The gain normalizer 22 receives the output from the loop filter 21, and normalizes (Fref/Kdco) the output, where Fref is a frequency of the reference signal REF, and Kdco is a gain of the DCO 23. The gain normalizer 22 then outputs the result to the adder 26. The adder 26 adds up the output from the gain normalizer 22 and the output from the voltage-fluctuation observer 11, and outputs the result to the DCO 23.

The DCO 23 outputs, to the clock tree 3, an oscillation signal having the frequency based on the output from the adder 26 as output (a clock) CLK from the timing-signal generation circuit 1, while feeding back the oscillation signal to the divider 24.

The clock tree 3 supplies circuits of the semiconductor integrated circuit with the clock CLK, for example, as a clock for a clock terminal of a flip-flop in the data path 4, through a plurality of buffers arranged in a tree. Note that the PLL 2, the clock tree 3, and the data path 4 illustrated in FIG. 3 are merely examples. It goes without saying that various variations and modifications may be made to the configuration.

Figure 4A:
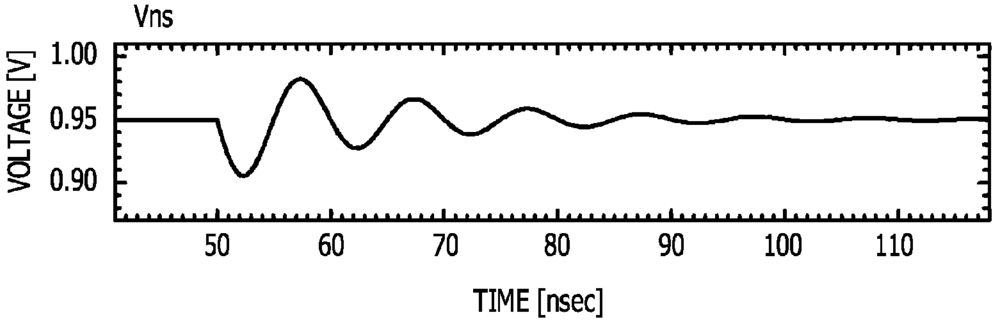
FIGS. 4A and 4B are graphs (2/3) for explaining the clock frequency control on the first droop noise.
Figure 4B:
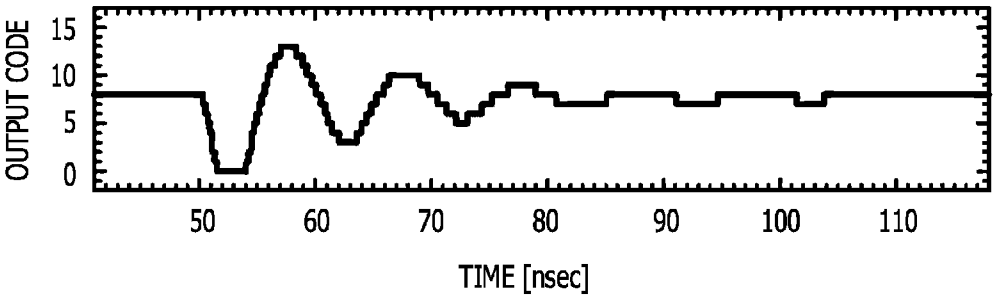

FIG. 4A illustrates an input voltage (Vns) of the voltage-fluctuation observer 11, and FIG. 4B illustrates an output code (measurement value Vfo) of the voltage-fluctuation observer 11. Note that in FIG. 4A, the horizontal axis represents time (nsec), and the vertical axis represents voltage (V). In FIG. 4B, the horizontal axis represents time (nsec), and the vertical axis represents output code.

Figure 5A:
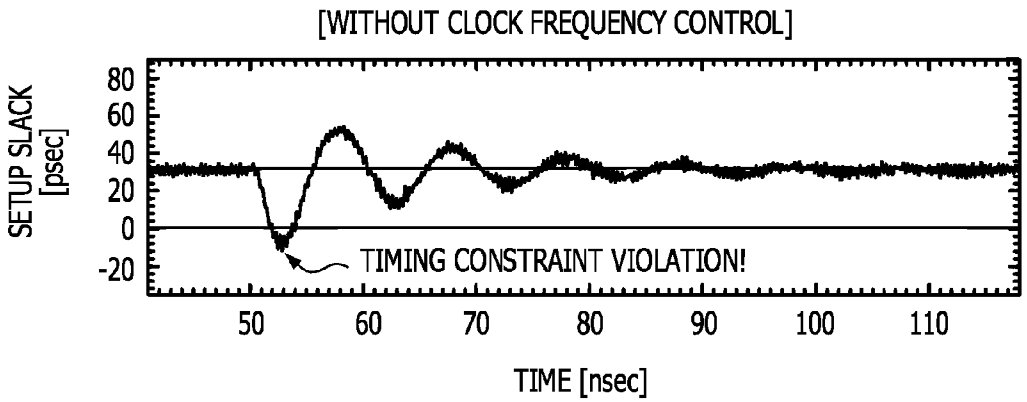
FIGS. 5A and 5B are graphs (3/3) for explaining the clock frequency control on the first droop noise.
Figure 5B:
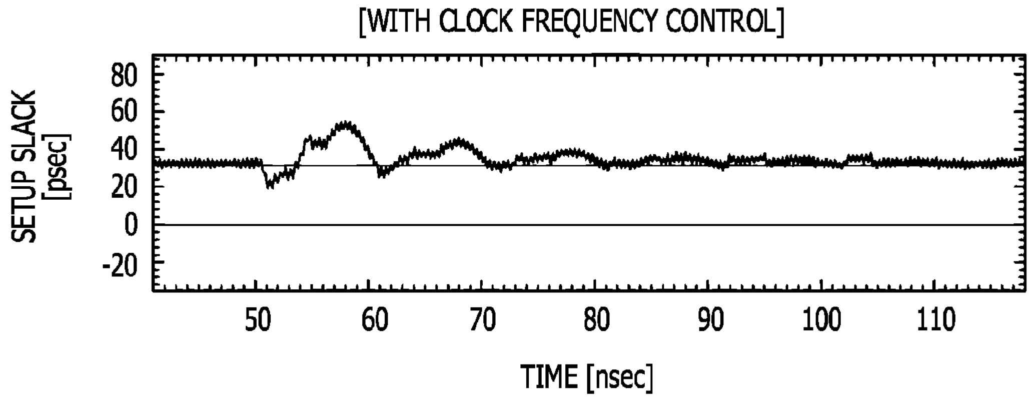

FIGS. 5A and 5B are provided for explaining the clock frequency control of the first droop noise. FIG. 5A illustrate a case where the clock frequency control is not performed. FIG. 5B illustrates a case where the clock frequency control is performed. In FIGS. 5A and 5B, the horizontal axis represents time (nsec), and the vertical axis represents setup slack (psec).

To perform the clock frequency control on the power supply noise in FIG. 2 in the timing-signal generation circuit 1 illustrated in FIG. 3, for example, a low-pass filter is provided at an input end of the voltage-fluctuation observer 11, or a moving-average filter, a finite impulse response (FIR) filter, or the like is provided at an output end of the voltage-fluctuation observer 11. This enables removal of high frequency components.

However, as illustrated in FIG. 5A, in the case where the clock frequency control is not performed on the first droop noise, a voltage drop and thus the timing constraint violation occur. Accordingly, an error might occur.

In contrast, as illustrated in FIG. 5B, in the case where the clock frequency control is performed on the first droop noise, the clock frequency control enables the setup slack to be improved and thus to avoid the occurrence of the timing constraint violation.

However, if a filter is provided at the input or output end of the voltage-fluctuation observer 11, the voltage-fluctuation observer 11 has a considerable delay in the voltage fluctuation observation, so that a control delay is increased. In addition, for example, since the digital filter performs processing by using a synchronous circuit, a clock latency is also added to the process time. This also increases the control delay.

As described above, if the control delay (Td) increases, a trackable voltage-fluctuation frequency becomes lower. Accordingly, the voltage fluctuations (in the band from tens of MHz to hundreds of MHz attributable to the resonance frequency of a package, for example, at 150 MHz) that are unique to the semiconductor integrated circuit are not trackable in the frequency control.

FIGS. 6 to 8B are a diagram and graphs for explaining the clock frequency control performed in a case of simultaneous switching noise superposition, and illustrate effects exerted by the clock frequency control performed when a digital filter according to any one of the embodiments (described later) is not used.

Figure 6:
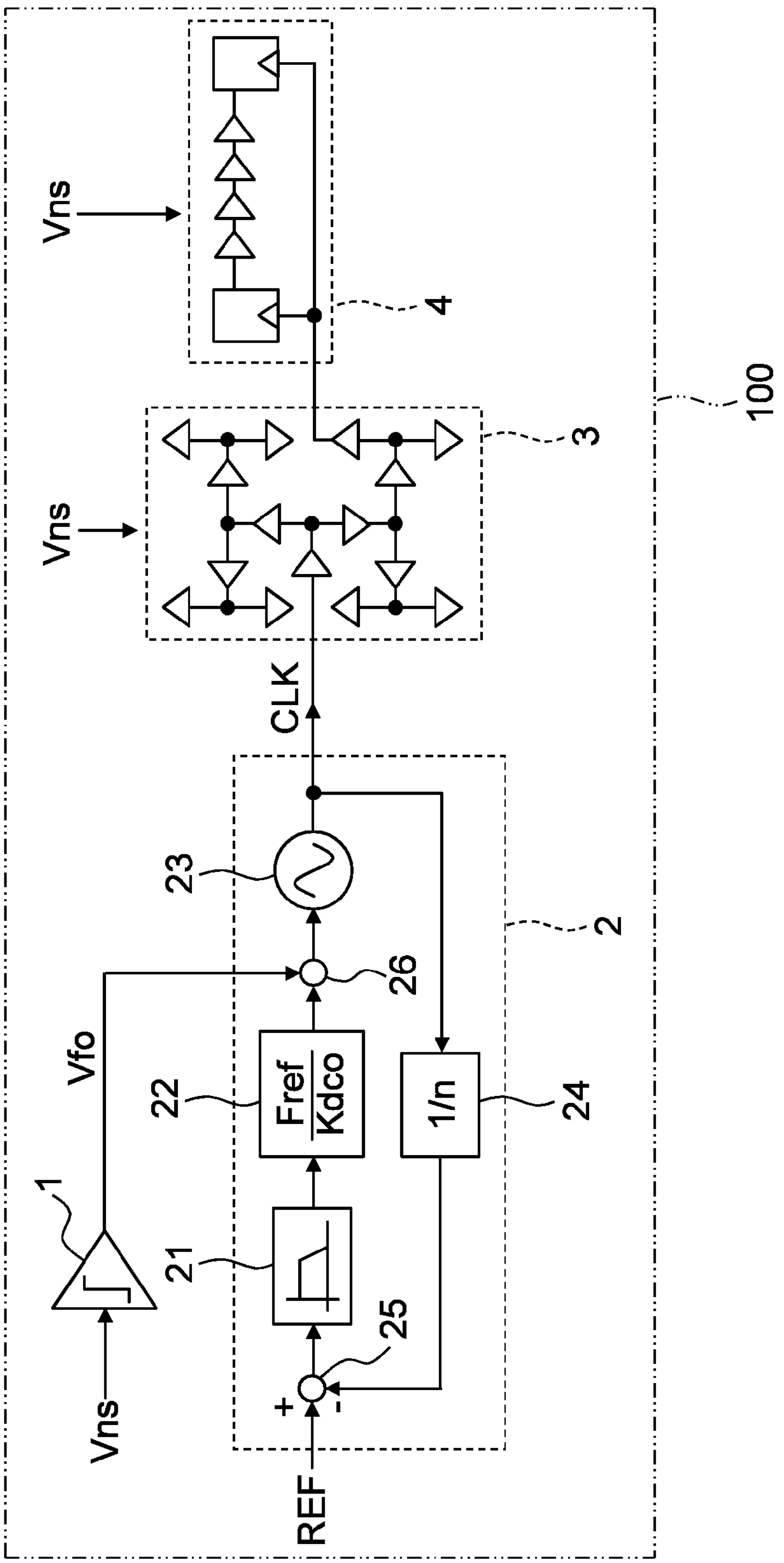
FIG. 6 is a diagram (1/3) for explaining the clock frequency control performed in a case of simultaneous switching noise superposition.
Figure 7A:
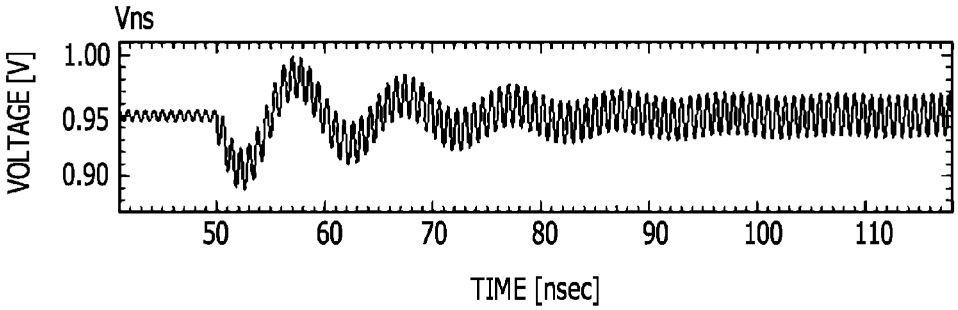
FIGS. 7A and 7B are graphs (2/3) for explaining the clock frequency control performed in the case of simultaneous switching noise superposition.
Figure 7B:
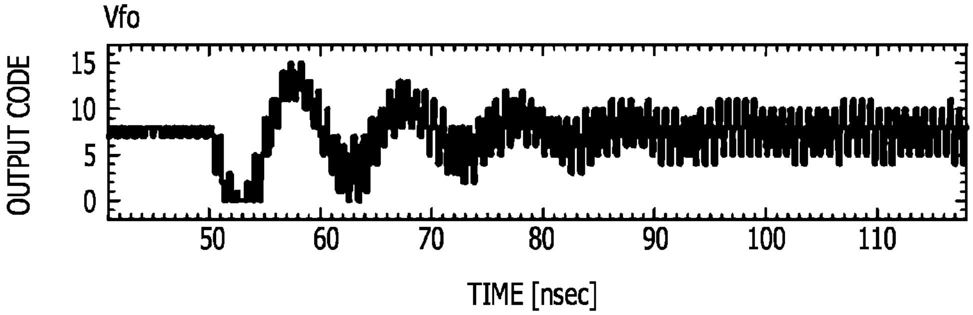

FIG. 6 illustrates a semiconductor integrated circuit (the semiconductor chip 100) having the same configuration as the aforementioned configuration in FIG. 3. FIGS. 7A and 7B correspond to FIGS. 4A and 4B described above, and FIGS. 8A and 8B correspond to FIGS. 5A and 5B described above.

From comparisons each between FIG. 7A and FIG. 4A, FIG. 7B and FIG. 4B, FIG. 8A and FIG. 5A, FIG. 8B and FIG. 5B, it is obvious that the clock frequency control exerts its advantageous effects also in the case of simultaneous switching noise superposition.

Figure 8A:
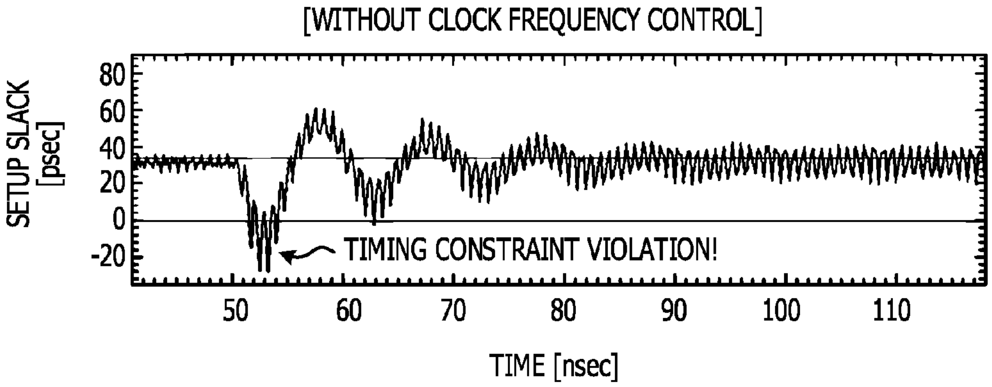
FIGS. 8A and 8B are graphs (3/3) for explaining the clock frequency control performed in the case of simultaneous switching noise superposition.

Specifically, as is clear from a comparison between FIG. 8A and FIG. 5A, if the clock frequency control is not performed on the first droop noise in the case of simultaneous switching noise superposition, a voltage drop and thus a timing constraint violation occur. Accordingly, an error might occur.

Figure 8B:
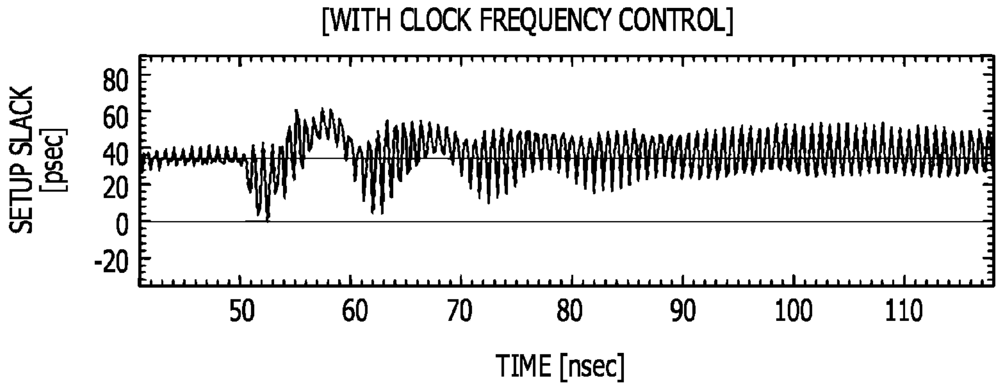

In contrast, as is clear from a comparison between FIG. 8B and FIG. 5B, if the clock frequency control is performed on the first droop noise in the case of simultaneous switching noise superposition, the clock frequency control thereby enables the setup slack to be improved and thus to avoid the occurrence of the timing constraint violation.

However, since the foregoing clock frequency control method employs the feedforward control, it takes time to measure an oscillation frequency of a ring oscillator, and thus only delay variation attributable to low-frequency voltage fluctuations is addressed.

Meanwhile, another example of the proposed clock frequency control methods is a method by which, based on setup slack measured by a critical path monitor, a clock frequency of a PLL is modulated to control an amount of setup slack.

However, this method employs feedback control, and thus has a late response when a disturbance factor is to be addressed. Accordingly, only delay variation attributable to low-frequency voltage fluctuations is addressed.

As described above, the semiconductor integrated circuit package has the resonance frequency of, for example, tens of MHz to hundreds of MHz, and thus the voltage at a sudden consumed-current increase fluctuates in a band from tens of MHz to hundreds of MHz.

Accordingly, in the example of the clock frequency control method described above, the control is not performed in time for the delay variation in the resonance frequency band of the semiconductor integrated circuit package. It is thus difficult to fully compensate for the delay variation.

Further, even if a circuit capable of high-speed feedforward control is provided, the control delay is not reduced to zero. The feedforward control is performed in a period from detecting the voltage fluctuations that are a disturbance factor of the delay variation to applying the oscillation-frequency modulation to a PLL.

As described above, the control delay is denoted by Td, the voltage-fluctuation frequency (first droop noise) is denoted by Fns, and the cycle of the voltage fluctuations is denoted by Tns. Unless $Td \leq Tns/8$ holds true, the frequency modulation is not performed in time. In other words, the clock frequency control exerts its advantageous effects on the voltage fluctuations in a band that satisfies $Fns=1/Tns \leq 1/(8Td)$.

However, even if the clock frequency control is performed on the voltage fluctuations in a band equal to or higher than 1/(8Td), the voltage fluctuations are not trackable in the frequency modulation, and thus the frequency is undesirably lowered. Thus, it is preferable that the clock frequency control not be performed on the voltage fluctuations in such a band ($Fns \geq 1/(8Td)$).

Hereinafter, embodiments of the digital filter, the timing signal generation circuit, and the semiconductor integrated circuit will be described in detail. However, before the embodiments are described, new findings leading to the embodiments will be described.

Firstly, an example of conceivable voltage fluctuations in the power supply wiring and the ground wiring in the semiconductor integrated circuit is voltage fluctuations (simultaneous switching noise) that occur at clock edges when the semiconductor integrated circuit operates in synchronization with the clock. Note that the voltage-fluctuation frequency of the simultaneous switching noise is the same as the clock frequency.

Further, another example of the conceivable voltage fluctuations in the power supply wiring and the ground wiring in the semiconductor integrated circuit is a sharp voltage drop (first droop noise) that occurs when an amount of current consumed by the semiconductor integrated circuit markedly increases. The voltage fluctuations caused by the first droop noise end with a steady state (a fixed potential), while vibrating, for example, at the resonance frequency of the package.

Here, the amplitude of the voltage fluctuations is compared between the simultaneous switching noise and the first droop noise. The amplitude of the voltage fluctuations caused by the first droop noise is four or more times larger than the amplitude of the voltage fluctuations caused by the simultaneous switching noise.

In addition, for example, recent processors operate at a clock frequency of 1 GHz or higher. The resonance frequency of a package of a processor is tens of MHz to hundreds of MHz (for example, 50 MHz to 150 MHz). Further, given the control delay of the clock frequency control that is approximately 1000 psec in practice, a tractable frequency in the clock frequency control is up to approximately a hundred and several tens of MHz (for example, 125 MHz).

Hence, for example, if the clock frequency control is performed on only the first droop noise having the large voltage-fluctuation amplitude, rather than the simultaneous switching noise having the small voltage-fluctuation amplitude and being difficult to be tracked in the clock frequency control, the clock frequency control is expected to sufficiently exert the advantageous effects.

In addition, for example, if the clock frequency control is performed focusing on the case of a voltage drop, the clock frequency control is also expected to sufficiently exert the advantageous effects. This is because the timing constraint violation attributable to the voltage fluctuations is to be addressed at the time of, for example, an operating-speed decrease in the semiconductor element caused by a voltage drop.

From the above, a high-frequency-component removing filter designed in consideration of the following points (A) to (C) may be provided at the output end of the voltage-fluctuation observation circuit.

(A) The amplitude of the simultaneous switching noise to be removed is four or less times smaller than the amplitude of the first droop noise not to be removed.

(B) The frequency of the simultaneous switching noise to be removed is ten or more times higher than the frequency of the first droop noise not to be removed.

(C) Priority is given to voltage drop acquisition over voltage bounce acquisition.

Note that since a digital filter using the general Z-function has a clock latency, it is preferable to use a digital filter obtained by combining rule-based filters designed in consideration of the foregoing points (A) to (C).

Specifically, as will be described later in detail, rule-based determination is performed to avoid the clock latency at the time of acquiring a voltage drop. Then, a limit value Vlm and a maximum value Vmx are set. If a measurement value Vfo is smaller than the limit value Vlm, the measurement value Vfo is outputted. If the measurement value Vfo is equal to or larger than the limit value Vlm, the maximum value Vmx is outputted (if Vfo<Vlm then Vfo, else Vmx).

The noise amplitude of the simultaneous switching noise is set based on the limit value Vlm. The maximum value Vmx is used to determine the upper limit of an output value Vhc, and any value higher than the maximum value Vmx is not outputted. When the noise amplitude of the simultaneous switching noise is equal to or lower than the limit value Vlm, the semiconductor integrated circuit operates desirably.

However, the noise amplitude of the simultaneous switching noise is dependent on a semiconductor integrated circuit, and thus the limit value Vlm is preferably set automatically on an operation basis.

Next, the digital filter, the timing signal generation circuit, and the semiconductor integrated circuit according to the embodiments will be described in detail with reference to the attached drawings.

Figure 9:
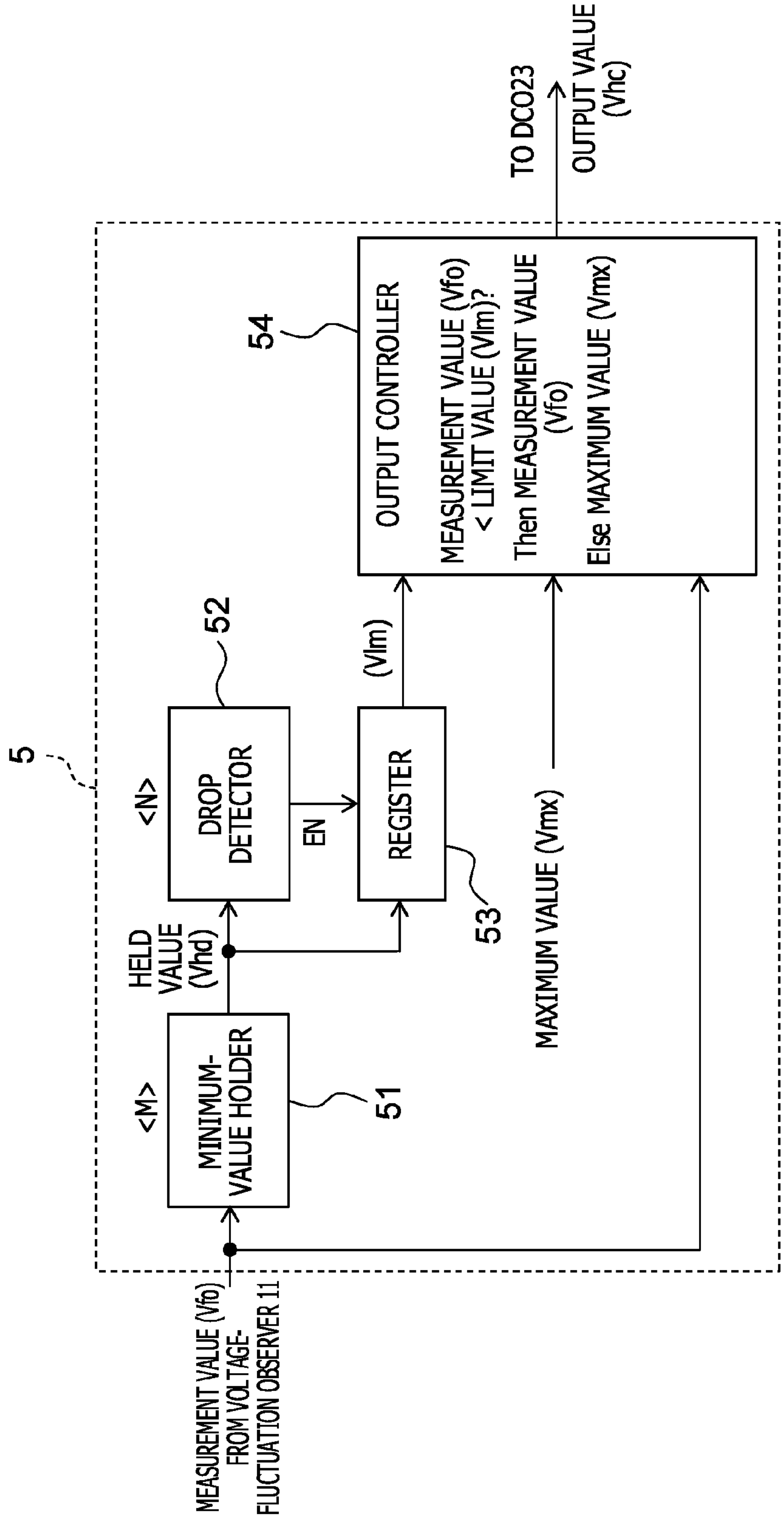
FIG. 9 is a block diagram illustrating a digital filter according to a first embodiment.
Figure 10:
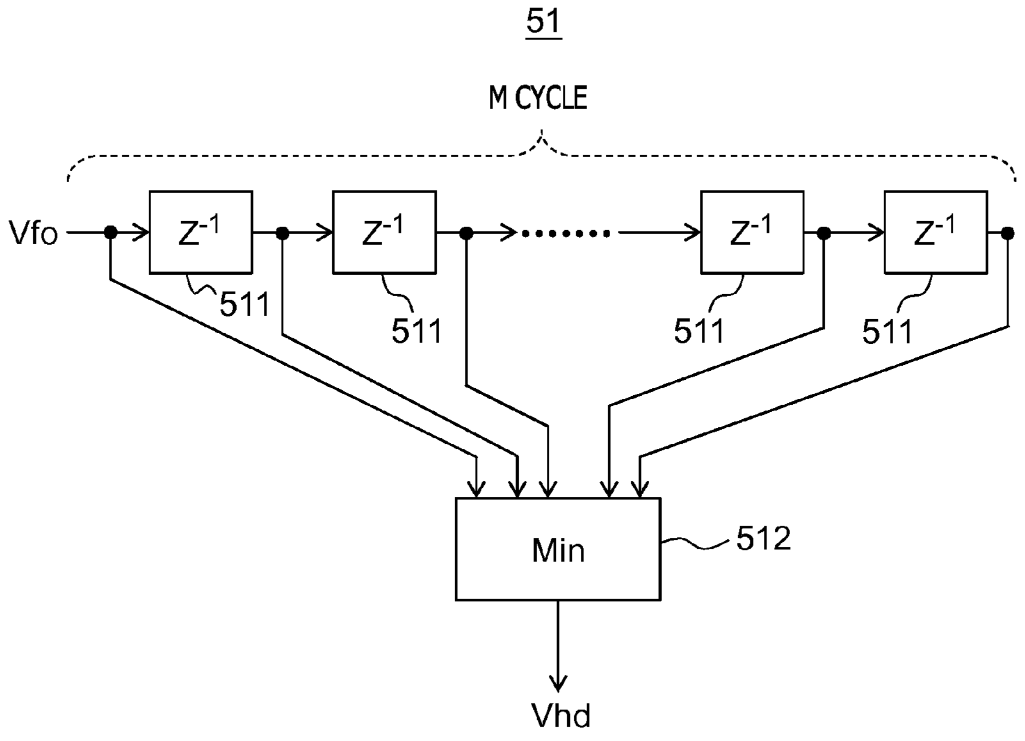
FIG. 10 is a block diagram illustrating an example of a minimum-value holder in the digital filter illustrated in FIG. 9.

FIG. 9 is a block diagram illustrating a digital filter according to a first embodiment. FIG. 10 is a block diagram illustrating an example of a minimum-value holder 51 of the digital filter illustrated in FIG. 9. As illustrated in FIG. 9, a digital filter 5 according to the first embodiment includes the minimum-value holder 51, a drop detector 52, a register 53, and an output controller 54.

The minimum-value holder 51 receives an output code (measurement value) Vfo from the voltage-fluctuation observer 11. The minimum-value holder 51 holds the minimum value of the measurement value Vfo received during M cycles (for example, 16 cycles (16 sampling points)), and outputs the held value as a held value Vhd. The voltage-fluctuation observer 11 receives the input voltage Vns, measures voltage fluctuations, and outputs the measurement value Vfo to the minimum-value holder 51 and the output controller 54.

As illustrated in FIG. 10, the minimum-value holder 51 includes (M−1) delay elements 511 and a minimum-value holder 512, and outputs, to the minimum-value holder 512, M pieces of data that are composed of the measurement value Vfo received from the voltage-fluctuation observer 11 and pieces of data delayed by one sampling cycle from one another by the delay elements 511. The minimum-value holder 512 receives the M (for example, 16) pieces of sampling data and outputs the minimum value as the held value Vhd.

Here, a frequency (sampling frequency) Fck of the clock for acquiring the M pieces of sampling data from the measurement value Vfo in the minimum-value holder 51 is set at, for example, 5 GHz. Then, if the voltage-fluctuation frequency Fns is equal to or higher than one M-th of the sampling frequency Fck (Fns≥Fck/M), the same minimum value is held throughout the total period, and is used as the held value Vhd.

The drop detector 52 receives the minimum value (held value Vhd) held by the minimum-value holder 51, and outputs an enable signal EN to the register 53 in a case where the held value Vhd remains minimum during predetermined N cycles (for example, 24 cycles).

The register 53 receives the held value Vhd from the minimum-value holder 51 and stores the held value Vhd. In response to the enable signal EN from the drop detector 52, the register 53 outputs, as the limit value Vlm, the held value Vhd remaining minimum during the N cycles, to the output controller 54. Note that the drop detector 52 and the register 53 form a circuit that receives the held value Vhd and that outputs the held value Vhd as the limit value Vlm in the case where the held value Vhd remains minimum during the N cycles.

Note that the digital filter according to the first embodiment removes frequency components in a range equal to or higher than Fck/M, and thus does not remove frequency components lower than Fck/M. Specifically, in the case of Fns≥Fck/M, the same minimum value is held throughout the total period, and thus the held value Vhd (minimum value) is used as the limit value Vlm, without being changed. The amplitude of the voltage fluctuations of a frequency component (Fns≥Fck/M) is automatically set as the limit value Vlm and is inputted to the output controller 54.

The output controller 54 receives the maximum value Vmx representing the upper limit, the measurement value Vfo, and the limit value Vlm. If the measurement value Vfo is smaller than the limit value Vlm, that is, if Vfo<Vlm holds true, the output controller 54 outputs the measurement value Vfo as the output value Vhc to the DCO 23. If the measurement value Vfo is equal to or larger than the limit value Vlm, that is, if Vfo≥Vlm holds true, the output controller 54 outputs the maximum value Vmx as the output value Vhc to the DCO 23.

Note that if Fns<Fck/M holds true, the limit value Vlm is set at "0" for a frequency component lower than Fck/M. If a decrease in the minimum value (held value Vhd) of the measurement value Vfo is detected, the current value of the limit value Vlm is maintained. If the held value Vhd remains or increases during the N cycles, the limit value Vlm is updated to the current held value Vhd.

Figure 11:
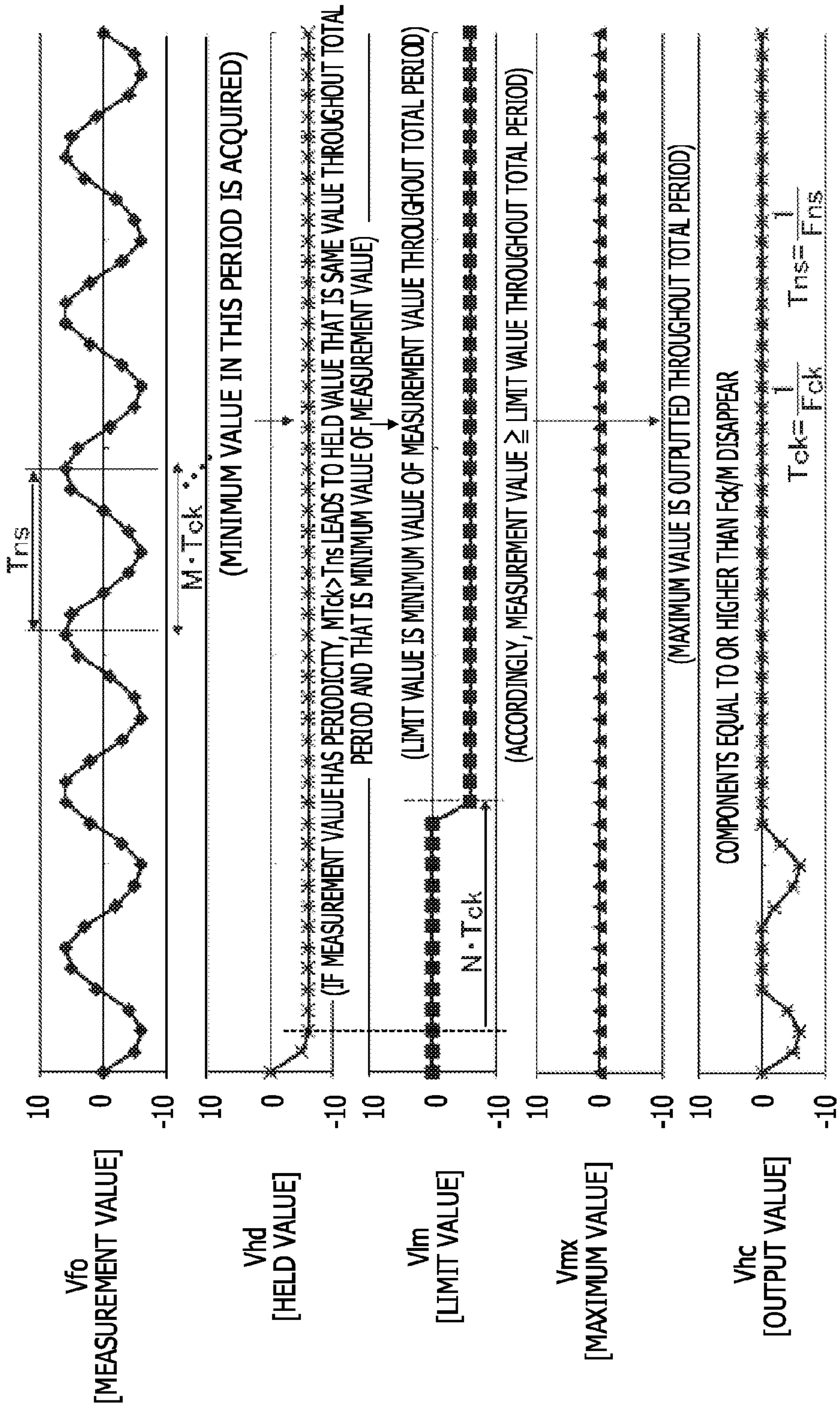
FIG. 11 is a time chart for explaining an example of operation of the digital filter illustrated in FIG. 9.

FIG. 11 is a time chart for explaining an example of operation of the digital filter illustrated in FIG. 9. Here, assume that Fns≥Fck/M holds true for the voltage-fluctuation frequency Fns and that the measurement value Vfo has periodicity in cycles Tns. As illustrated in FIG. 11, in the case of M·Tck>Tns where the frequency of the sampling clock is Tck, the same value is held as the held value Vhd (the minimum value of the measurement value Vfo) throughout the total period.

Note that M is the number of samples obtained by the minimum-value holder 51, and is set at, for example, 16. In addition, Fck is a frequency of the sampling clock, and is set at, for example, 5 GHz. These values are merely examples, and it goes without saying that various values may be set.

The register 53 controlled in accordance with the enable signal EN from the drop detector 52 outputs the held value Vhd (the minimum value of the measurement value Vfo) as the limit value Vlm to the output controller 54. Since the measurement value Vfo≥the limit value Vlm holds true throughout the total period, the output controller 54 outputs the maximum value Vmx as the output value Vhc to the DCO 23. The power supply fluctuations (voltage fluctuations (noise): Fns≥Fck/M) in the frequency band equal to or higher than Fck/M are thereby cut off, and thus the clock frequency control is not performed.

Figure 12:
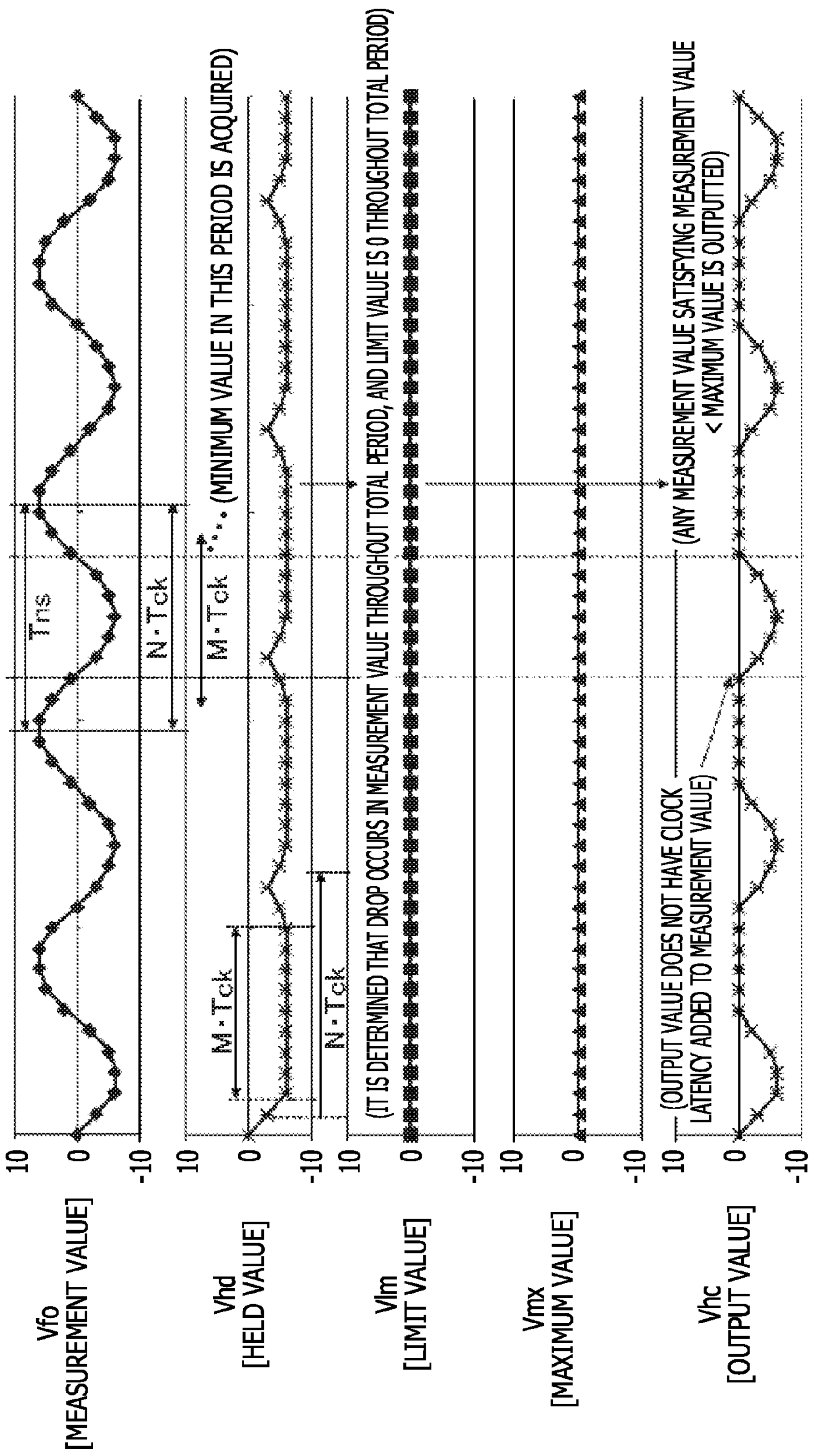
FIG. 12 is a time chart for explaining another example of the operation of the digital filter illustrated in FIG. 9.

FIG. 12 is a time chart for illustrating another example of the operation of the digital filter illustrated in FIG. 9. As illustrated in FIG. 12, if Fck/N≤Fns<Fck/M holds true for the voltage-fluctuation frequency Fns, a period in which the held value Vhd decreases is present in each of the N cycles (N·Tck). Accordingly, the limit value Vlm is not updated. In other words, it is determined that a drop in the measurement value Vfo occurs throughout the total period, and the limit value Vlm remains “0”.

Note that N is a predetermined number of cycles and is set at, for example, 24. The drop detector 52 determines whether the held value Vhd from the minimum-value holder 51 remains minimum during the period. The value of N may also be set at various values in a similar manner to the value of M described above. However, the embodiments are described under the assumption that M<N holds true.

Meanwhile, the output value Vhc outputted from the output controller 54 does not have a clock latency. The measurement value Vfo of the power supply fluctuations (Fck/N≤Fns<Fck/M) in the frequency band that is equal to or higher than Fck/N and that is lower than Fck/M is thereby inputted as the output value Vhc without being changed, to the DCO 23, and thus the clock frequency control is appropriately performed. In other words, a disadvantage of the clock frequency control performed on the particular-frequency-band voltage fluctuations may be avoided.

Figure 13:
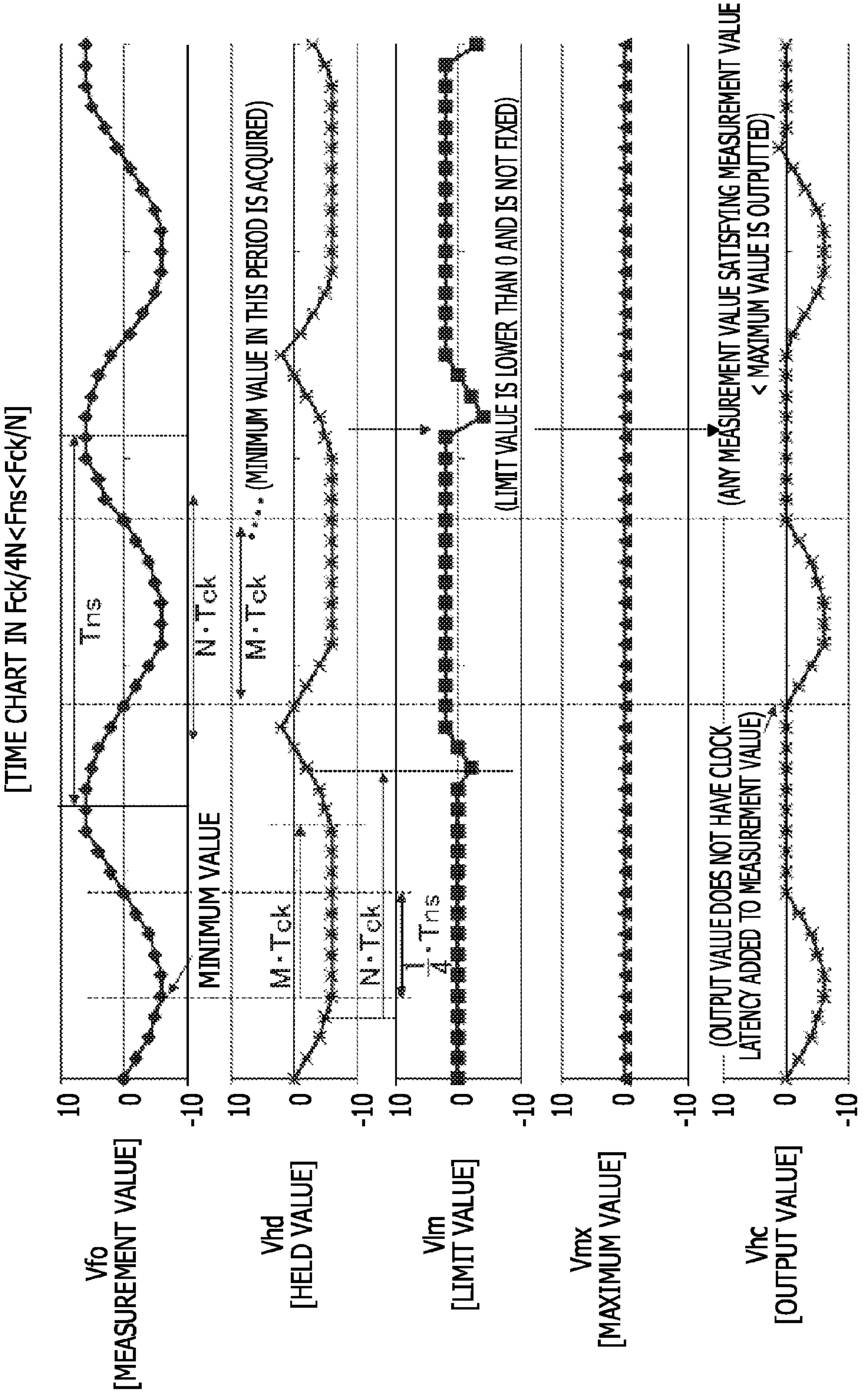
FIG. 13 is a time chart for explaining yet another example of the operation of the digital filter illustrated in FIG. 9.

FIG. 13 is a time chart for explaining a yet another example of the operation of the digital filter illustrated in FIG. 9. As illustrated in FIG. 13, if Fck/4N<Fns<Fck/N holds true for the voltage-fluctuation frequency Fns, periods in which the held value Vhd does not decrease are present during the N cycles (N·Tck), and thus the limit value Vlm is updated.

However, in periods in which the measurement value Vfo falls below “0” (for example, periods represented by M·Tck in the measurement value Vfo in FIG. 13), the measurement value Vfo≥the limit value Vlm does not hold true. Accordingly, in terms of the voltage-fluctuation frequency Fns, in both cases of the frequency band satisfying Fck/4N<Fns<Fck/N illustrated in FIG. 13 and the frequency band satisfying Fck/N≤Fns<Fck/M described with reference to FIG. 12, the same output value Vhc is outputted.

Meanwhile, the output value Vhc outputted from the output controller 54 does not have a clock latency. The measurement value Vfo of the power supply fluctuations (Fck/4N<Fns<Fck/N) in the frequency band that is higher than Fck/4N and that is lower than Fck/N is thereby inputted as the output value Vhc without being changed, to the DCO 23, and thus the clock frequency control is appropriately performed.

Figure 14:
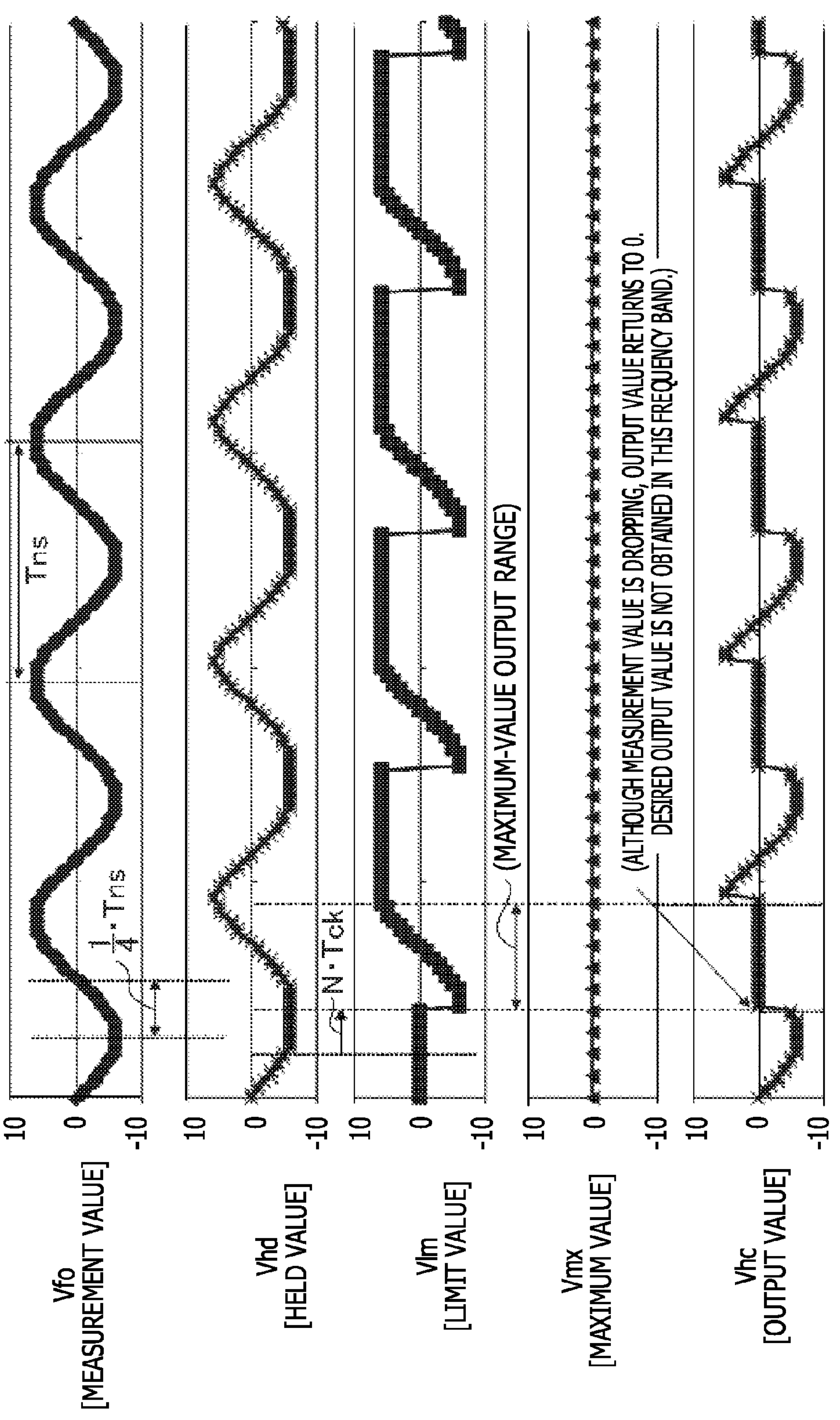
FIG. 14 is a time chart for explaining yet another example of the operation of the digital filter illustrated in FIG. 9.

FIG. 14 is a time chart for explaining yet another example of the operation of the digital filter illustrated in FIG. 9. As illustrated in FIG. 14, if Fns≤Fck/4N holds true for the voltage-fluctuation frequency Fns, the measurement value Vfo≥the limit value Vlm holds true in periods in which the measurement value Vfo falls below “0”, and the maximum value Vmx is outputted as the output value Vhc.

This means that desired output is not obtained in the power supply fluctuations (Fns≤Fck/4N) in the frequency band equal to or lower than Fck/4N. To address the power supply fluctuations (voltage fluctuations) in the frequency band equal to or lower than Fck/4N, digital filters according to second, third, fourth, fifth, sixth, seventh, and eighth embodiments (described later) may be used.

As described above, with the digital filter according to the first embodiment, frequency components equal to or higher than Fck/M are removed, but desired output is not obtained from frequency components equal to or lower than Fck/4N. Accordingly, for example, a frequency band satisfying Fck/4N<Fns<Fck/M (N>M) is used.

Figure 15:
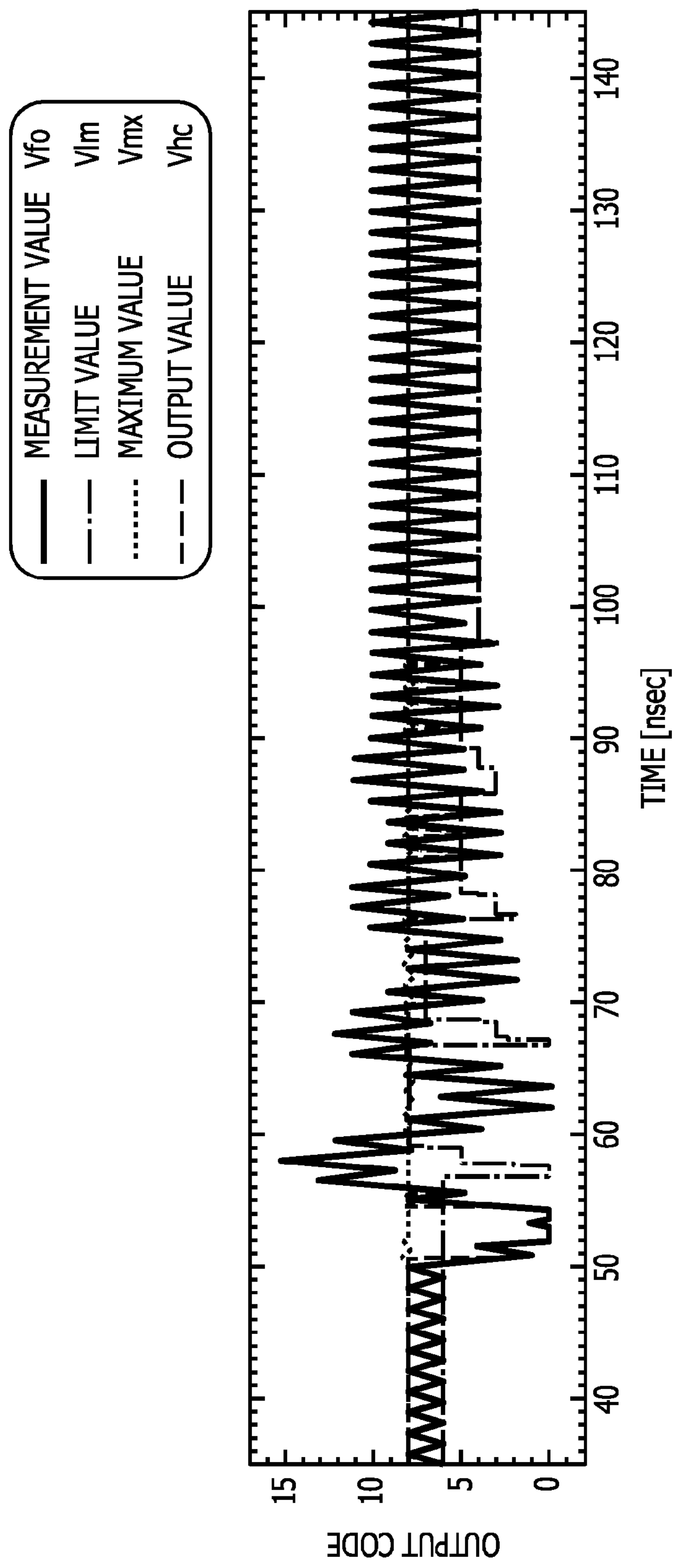
FIG. 15 is a graph illustrating a simulation result in the operation of the digital filter illustrated in FIG. 9.

FIG. 15 is a graph illustrating a simulation result in the operation of the digital filter illustrated in FIG. 9, and illustrates a case where a power supply is subjected to small-amplitude voltage fluctuations of a frequency component satisfying Fns≥Fck/M and the first droop noise as being the large-amplitude frequency component satisfying Fck/4N<Fns<Fck/M.

As illustrated in FIG. 15, the digital filter according to the first embodiment removes the small-amplitude voltage fluctuations of the frequency component satisfying Fns≥Fck/M and outputs only the large-amplitude voltage fluctuations of the frequency component satisfying Fck/4N<Fns<Fck/M.

This enables the clock frequency control to be effectively performed even on a semiconductor integrated circuit a package of which has a resonance frequency of, for example, tens of MHz to hundreds of MHz. Accordingly, the digital filter according to the first embodiment enables the clock frequency control to be performed appropriately. In other words, even in a semiconductor integrated circuit a package of which has a resonance frequency of, for example, tens of MHz to hundreds of MHz, a disadvantage of the clock frequency control may be avoided. The advantageous effects are also exerted in embodiments to be described below.

FIGS. 16 to 18B are a diagram and graphs for explaining the clock frequency control performed in a case where the digital filter according to the first embodiment removes simultaneous switching noise, and for schematically explaining the advantageous effects described above with reference to FIGS. 11 to 15. In other words, FIGS. 16 to 18B correspond to results of removing high frequency components in the clock frequency control described with reference to FIGS. 6 to 8B.

Figure 17A:
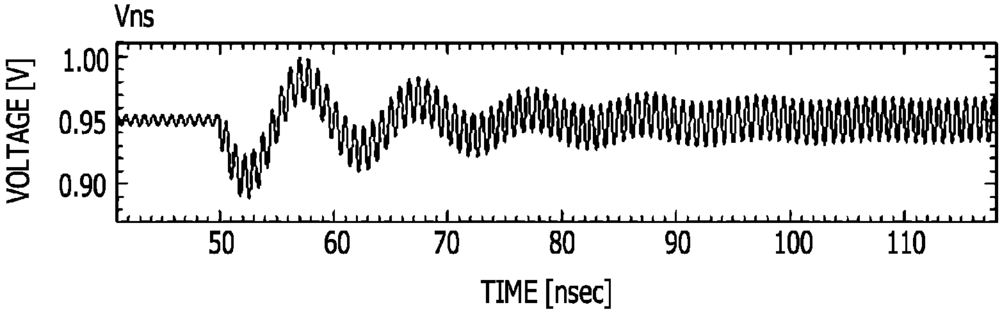
FIGS. 17A and 17B are graphs (2/3) for explaining the clock frequency control performed in the case where the digital filter according to the first embodiment removes the simultaneous switching noise.
Figure 17B:
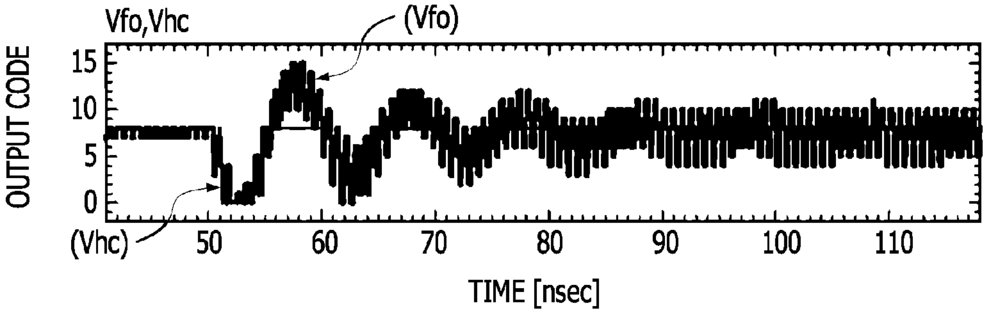

FIG. 17A illustrates an input voltage Vns of the voltage-fluctuation observer 11. FIG. 17B illustrates an output code from the voltage-fluctuation observer 11 (measurement value Vfo) and output (an output value) Vhc from the digital filter 5.

In FIG. 17A, the horizontal axis represents time (nsec), and the vertical axis represents voltage (V). In FIG. 17B, the horizontal axis represents time (nsec), and the vertical axis represents output code. FIG. 17A is the same as FIG. 7A described above, and the measurement value Vfo in FIG. 17B is the same as in FIG. 7B.

Figure 18A:
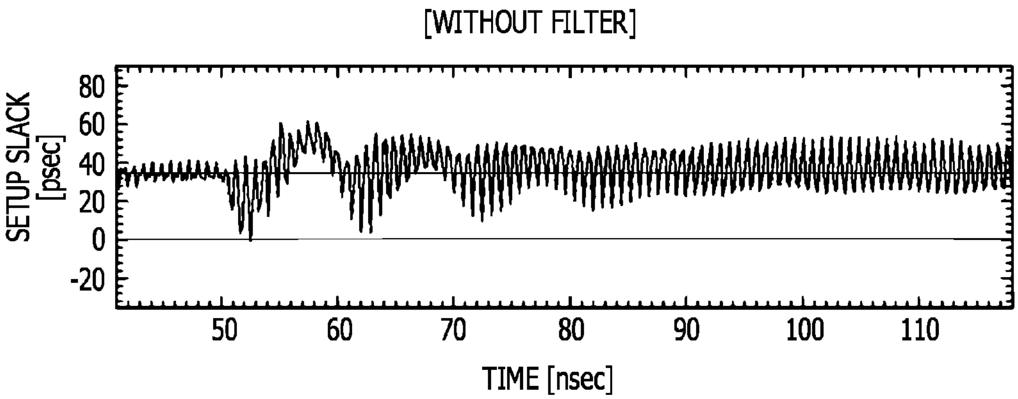
FIGS. 18A and 18B are graphs (3/3) for explaining the clock frequency control performed in the case where the digital filter according to the first embodiment removes the simultaneous switching noise.
Figure 18B:
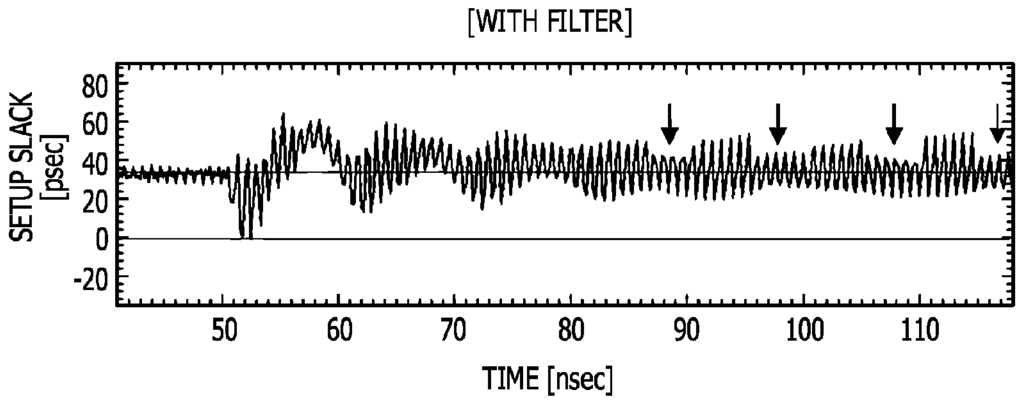

FIG. 18A illustrates a case where the clock frequency control is performed without the digital filter 5 being provided, and is the same as FIG. 8B. FIG. 18B illustrates a case where the clock frequency control is performed with the digital filter 5 being provided.

Figure 16:
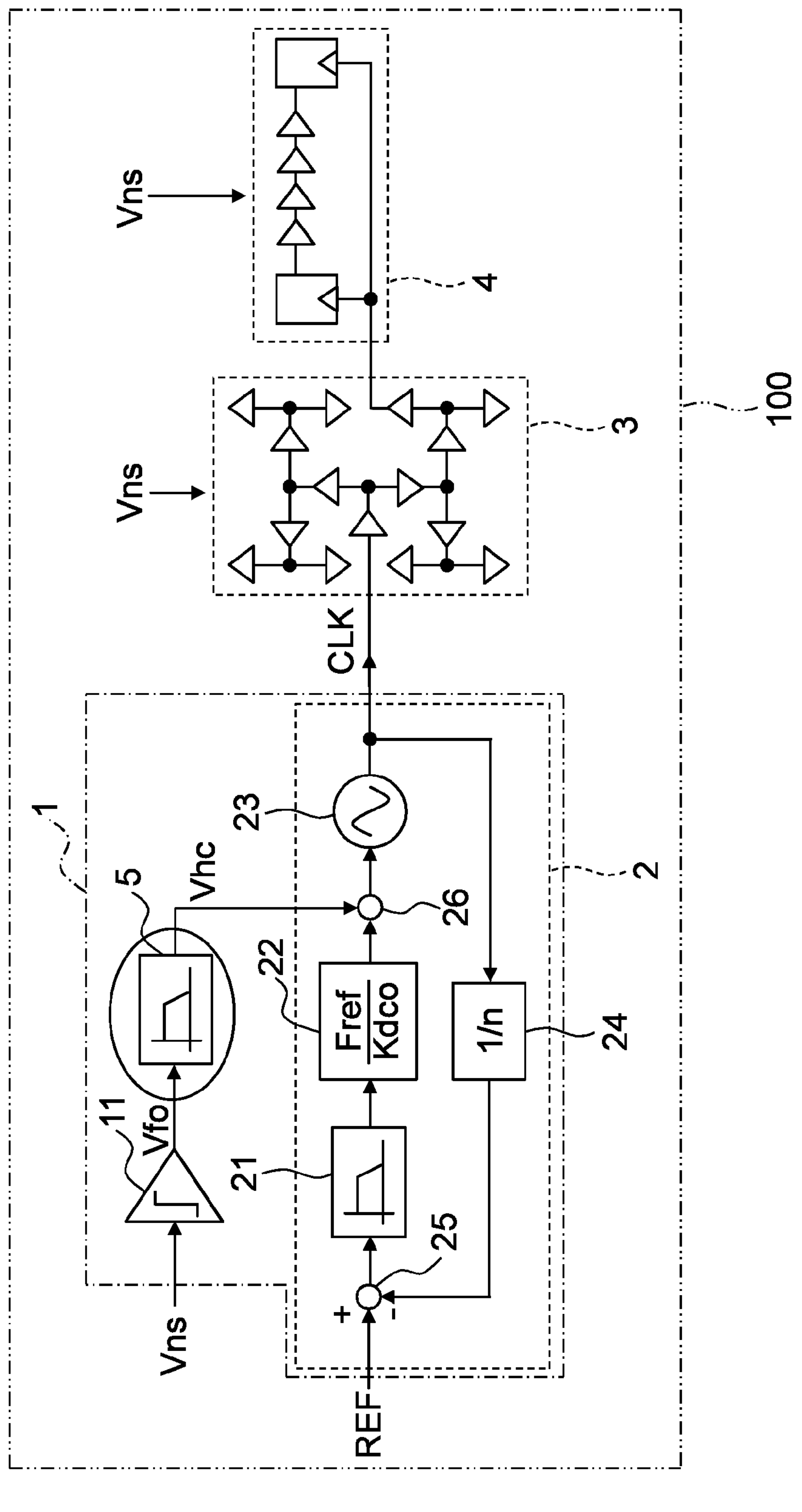
FIG. 16 is a diagram (1/3) for explaining clock frequency control performed in a case where the digital filter according to the first embodiment removes simultaneous switching noise.

As is clear from a comparison between FIG. 16 and FIG. 6 described above, a timing-signal generation circuit 1 according to this embodiment or a semiconductor integrated circuit (semiconductor chip 100) according to this embodiment including the timing-signal generation circuit 1 includes the digital filter 5 that is provided between the voltage-fluctuation observer 11 and the adder 26.

The digital filter according to the first embodiment described with reference to FIGS. 9 to 15 may be applied to the digital filter 5 in FIG. 16, and any one of the digital filters (described later) according to the second to eighth embodiments may also be applied to the digital filter 5 in FIG. 16 without any modification.

The digital filter 5 is provided in a part subsequent to the voltage-fluctuation observer 11 to process the input voltage Vns illustrated in FIG. 17A. The measurement value Vfo is thereby converted into the output value Vhc as illustrated in FIG. 17B and then is inputted to the adder 26.

As is clear from a comparison between the left part of FIG. 18A and the left part of FIG. 18B, the clock frequency control performed on the first droop noise enables the setup slack to be improved and thus the timing constraint violation to be avoided.

Further, as is clear from a comparison between the right part of FIG. 18A and the right part of FIG. 18B (a part indicated by the arrows in FIG. 18B), undesirable clock frequency control is not performed on the voltage fluctuations in a band equal to or higher than a predetermined frequency (for example, a frequency equal to or higher than Fck/M). In other words, the part indicated by the arrows in FIG. 18B exhibits the same characteristic as the aforementioned characteristic exhibited when the clock frequency control in FIG. 8A is not performed.

Figure 19:
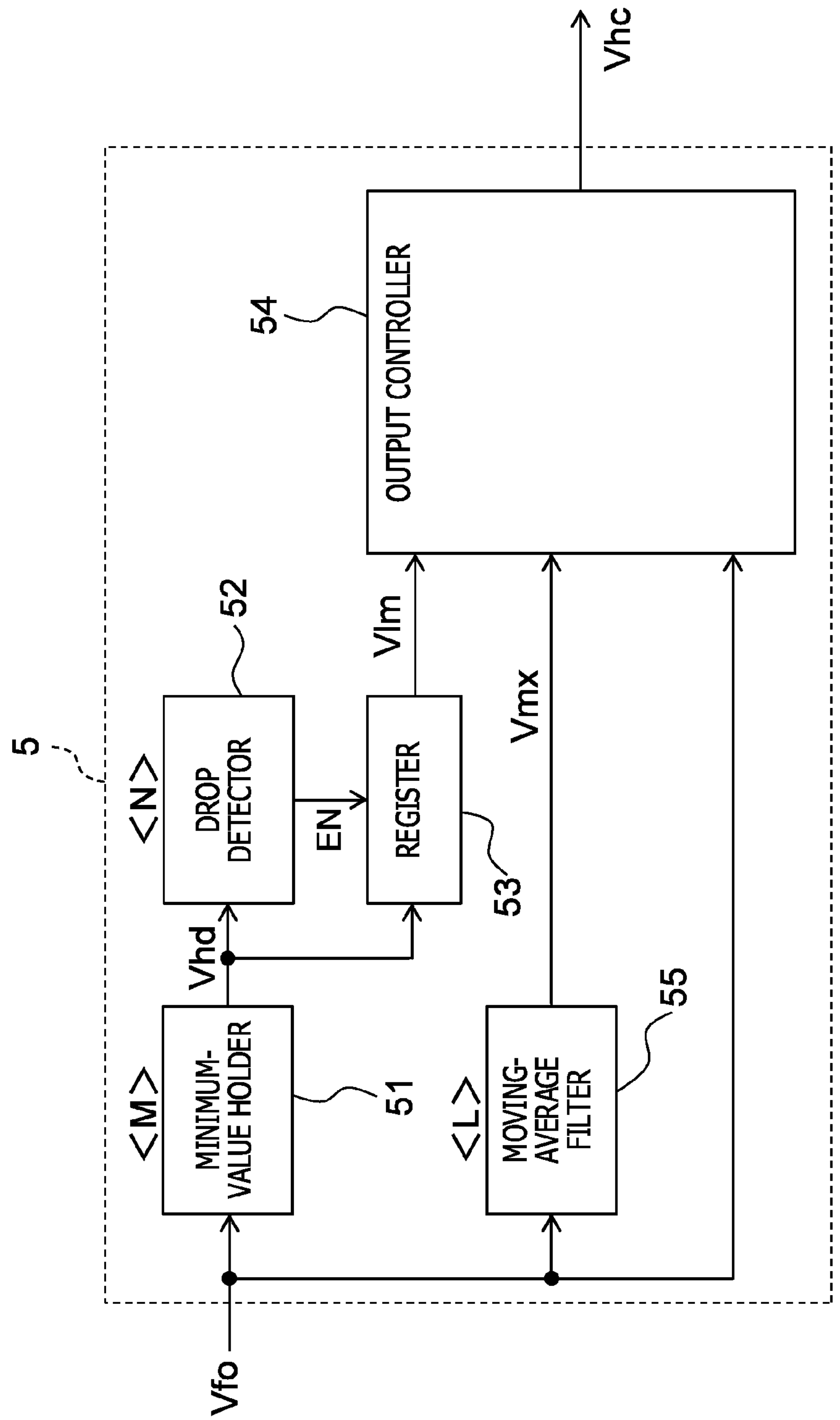
FIG. 19 is a block diagram illustrating a digital filter according to a second embodiment.

FIG. 19 is a block diagram illustrating a digital filter according to the second embodiment. As is clear from a comparison between FIG. 19 and FIG. 9 described above, a digital filter 5 according to the second embodiment corresponds to a digital filter in which a moving-average filter 55 is added to the digital filter according to the first embodiment illustrated in FIG. 9.

The digital filter 5 according to the second embodiment includes the moving-average filter 55 that generates the maximum value Vmx, and thus has been improved to obtain desired output also for a frequency band satisfying Fns≤Fck/4N.

Specifically, examples of the frequency band including a voltage-fluctuation frequency Fns satisfying Fck/4N include the second droop noise (for example, a frequency of approximately 1 MHz to approximately ten of MHz) described in FIG. 1. The digital filter 5 also supports the voltage fluctuations in such a frequency band.

In the first embodiment, a fixed value “0” is used as the maximum value Vmx to input the output controller 54. In the second embodiment, the moving-average filter 55 inputs, for example, a moving average of the measurement value Vfo during L cycles as the maximum value Vmx, to the output controller 54.

Since the moving-average filter 55 functions as a low-pass filter, frequency components higher than Fck/L are attenuated, and frequency components equal to or lower than Fck/L pass through the moving-average filter 55. Accordingly, the output value Vhc in the frequency band satisfying Fns≤Fck/4N is also outputted.

Figure 20:
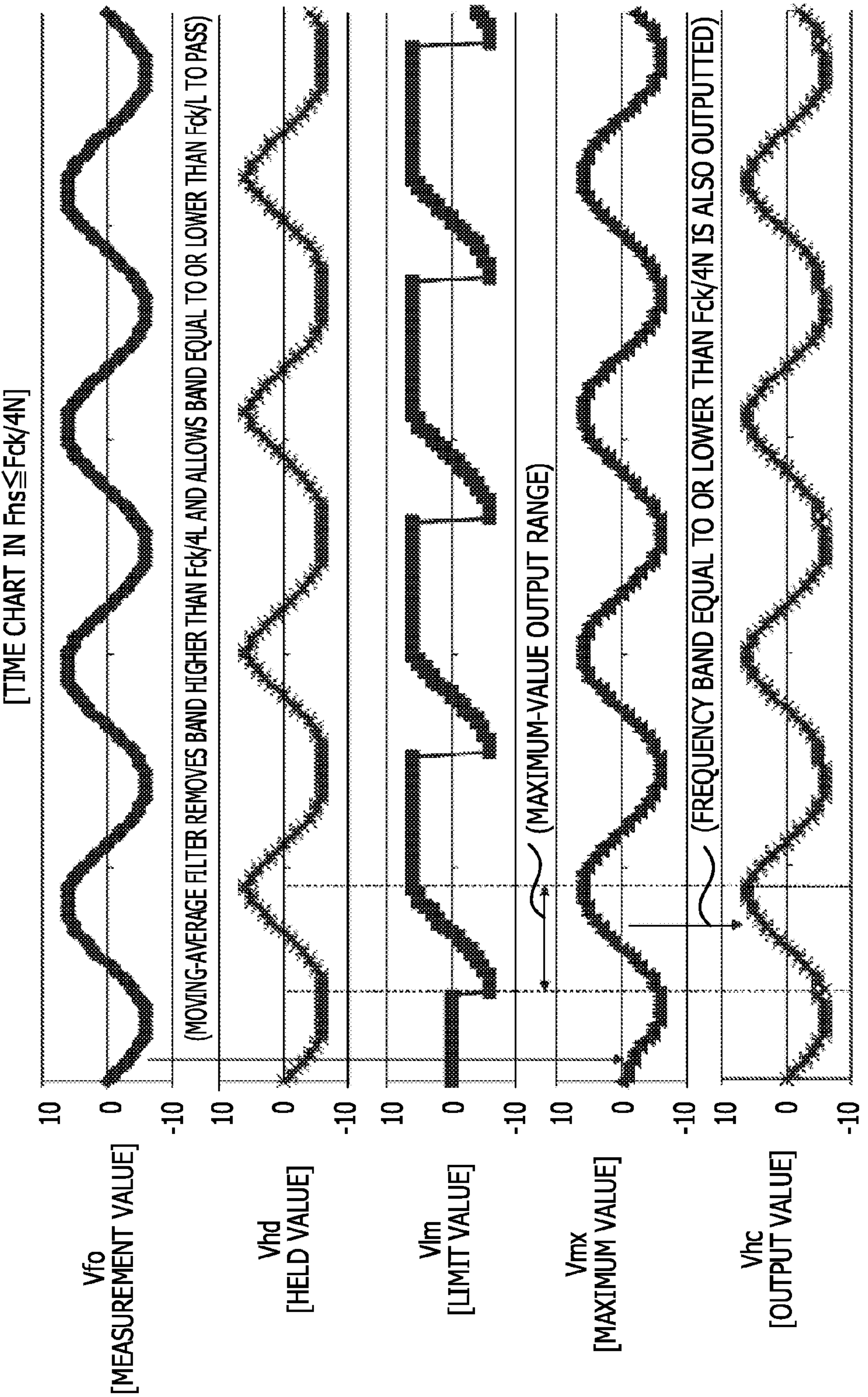
FIG. 20 is a time chart for explaining an example of operation of the digital filter illustrated in FIG. 19.

FIG. 20 is a time chart for explaining an example of operation of the digital filter illustrated in FIG. 19. As is clear from a comparison between FIG. 20 and FIG. 14, according to the second embodiment, not “0” but a moving average value of the measurement value Vfo during L cycles is used as the maximum value Vmx in ranges in which the maximum value Vmx is outputted in a case where Fns≤Fck/4N holds true, and thus the output value Vhc is the measurement value Vfo.

Figure 21:
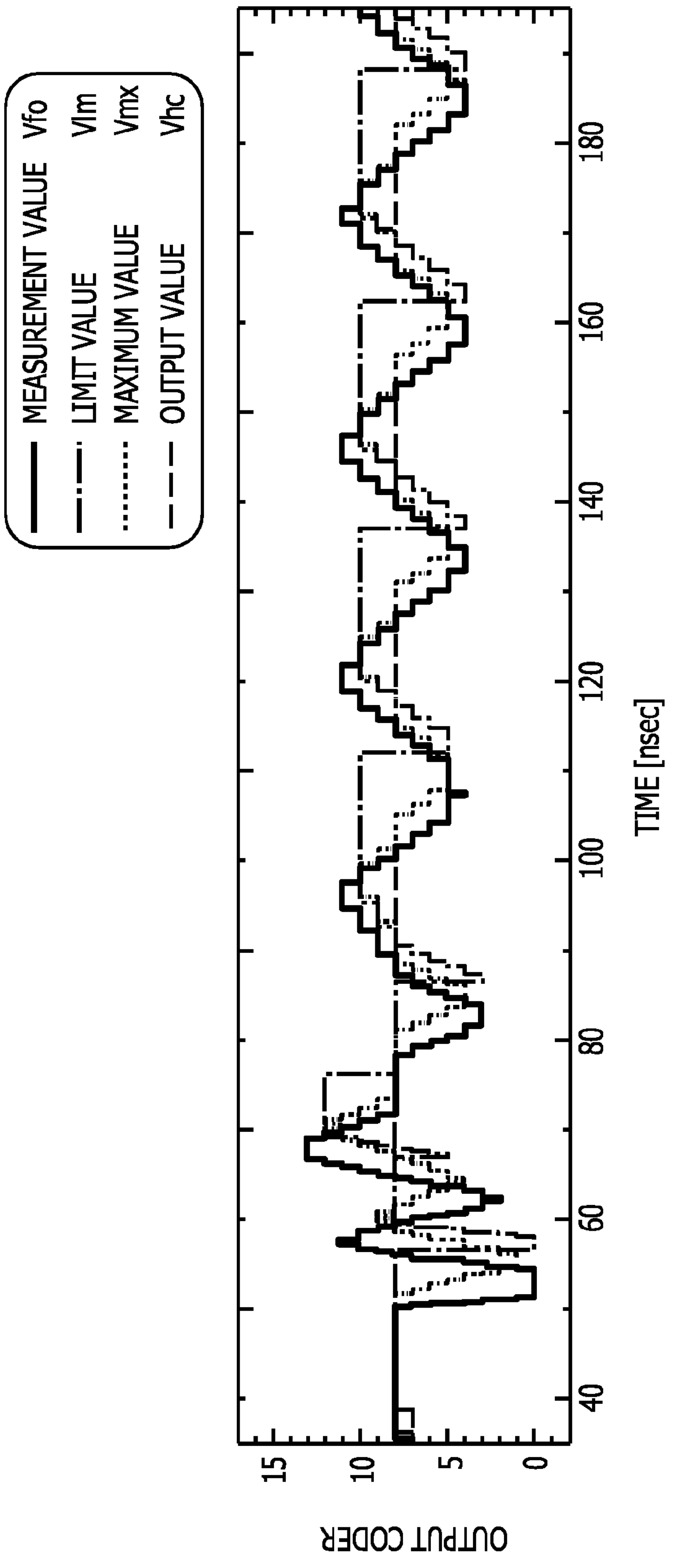
FIG. 21 is a graph illustrating a simulation result in the operation of the digital filter illustrated in FIG. 19.

FIG. 21 is a graph illustrating a simulation result in the operation of the digital filter illustrated in FIG. 19. Specifically, the power supply is subjected to small-amplitude voltage fluctuations (for example, the second droop noise) of a frequency component satisfying Fns≤Fck/4N and the first droop noise as being the large-amplitude frequency component satisfying Fck/4N<Fns<Fck/M.

As illustrated in FIG. 21, the digital filter according to the second embodiment removes the small-amplitude voltage fluctuations of the frequency component satisfying Fns≥Fck/M, and thus outputs the large-amplitude voltage fluctuations of the frequency components satisfying Fck/4N<Fns<Fck/M and Fns≤Fck/4N. This enables the clock frequency control to be performed appropriately also on the voltage fluctuations in the frequency band satisfying Fns≤Fck/4N.

Figure 22:
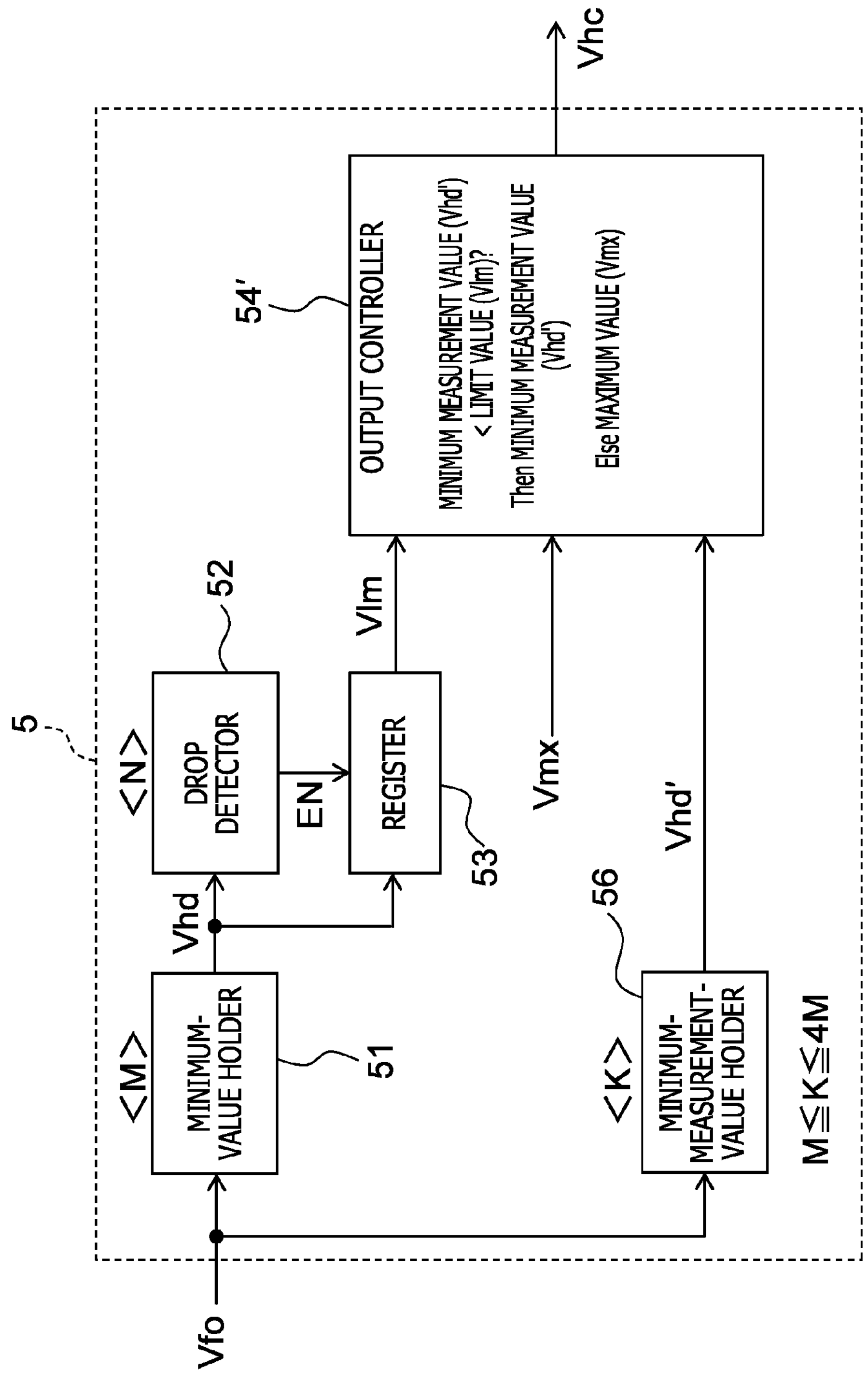
FIG. 22 is a block diagram illustrating a digital filter according to a third embodiment.

FIG. 22 is a block diagram illustrating a digital filter according to the third embodiment. As is clear from a comparison between FIG. 22 and FIG. 9 described above, a digital filter 5 according to the third embodiment corresponds to a digital filter in which a minimum-measurement-value holder 56 is further added to the digital filter according to the first embodiment illustrated in FIG. 9.

In the third embodiment, a minimum-measurement-value holder 56 is provided in addition to the minimum-value holder 51 that holds the minimum value of the measurement value Vfo during M cycles (for example, 16 cycles) and outputs the minimum value as the held value Vhd.

The minimum-measurement-value holder 56 is substantially the same holder as the minimum-value holder 51, but holds the minimum value of the measurement value Vfo at K sampling points (in K cycles) in contrast with the M sampling points of the minimum-value holder 51. The minimum-measurement-value holder 56 outputs the thus held minimum value as a minimum measurement value Vhd'.

A value of K representing the K sampling points of the minimum-measurement-value holder 56 is set at, for example, M≤K≤4M. For example, if M is set at 16, it is preferable to set K so as to satisfy 16≤K≤64.

Unlike the output controller 54 described above, an output controller 54' compares the limit value Vlm with the minimum measurement value Vhd', instead of the measurement value Vfo. The output controller 54' that compares the limit value Vlm with the minimum measurement value Vhd' is also applied to the fourth embodiment in FIG. 25, the seventh embodiment in FIG. 28, and the eighth embodiment in FIG. 29 (described later).

Nevertheless, if the measurement value Vfo and the minimum measurement value Vhd' are both regarded as comparison values Vfo and Vhd' based on the measurement value Vfo, the output controllers 54 and 54' may be considered to perform the same processing.

If the minimum measurement value Vhd' is smaller than the limit value Vlm, that is, if Vhd'<Vlm holds true, the output controller 54' outputs the measurement value Vfo as the output value Vhc to the DCO 23. If the minimum measurement value Vhd' is equal to or larger than the limit value Vlm, that is, Vhc'≥Vlm holds true, the output controller 54' outputs the maximum value Vmx as the output value Vhc to the DCO 23.

Figure 23:
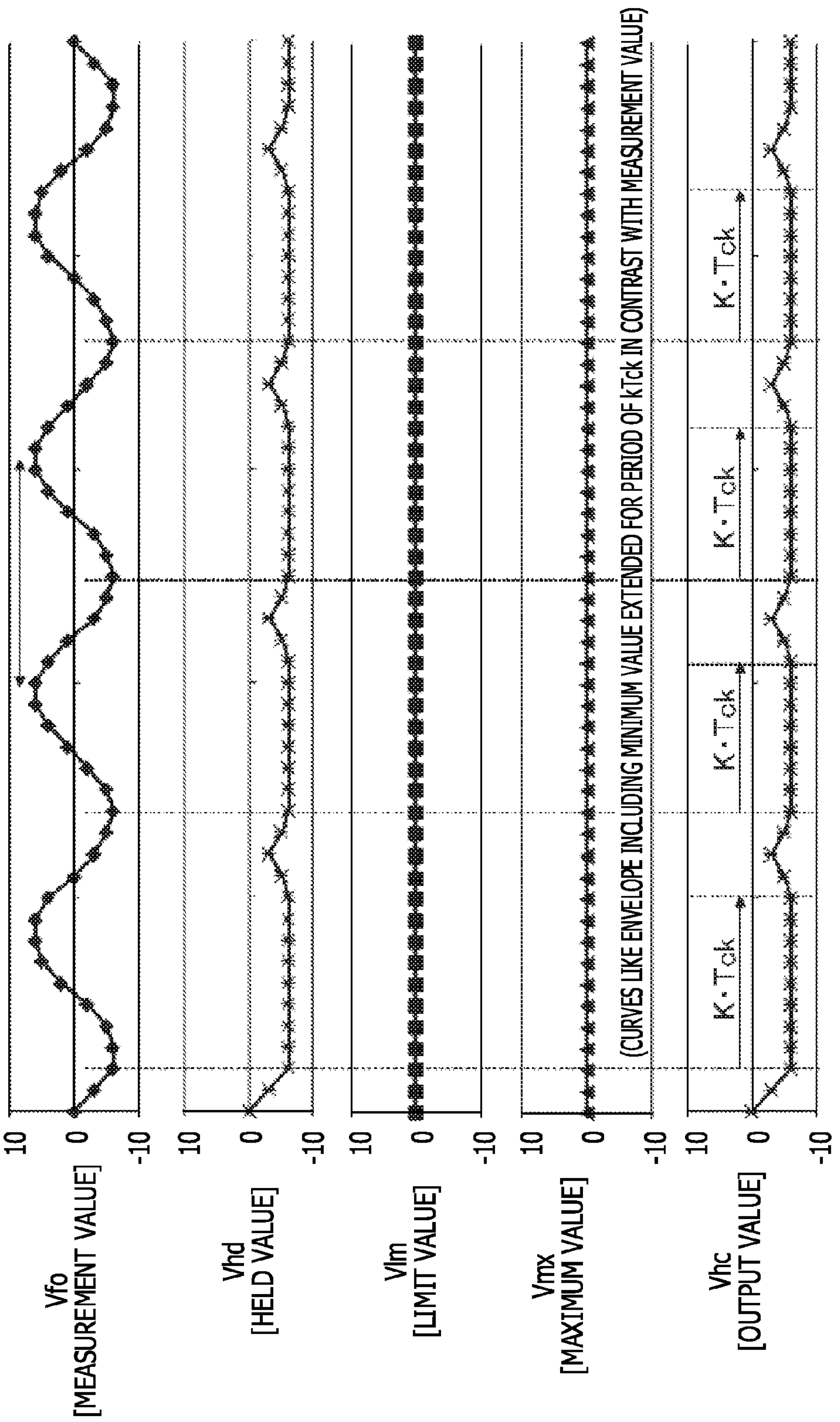
FIG. 23 is a time chart for explaining an example of operation of the digital filter illustrated in FIG. 22.

FIG. 23 is a time chart for explaining an example of operation of the digital filter illustrated in FIG. 22. As is clear from a comparison between FIG. 23 and FIG. 12 described above, according to the third embodiment, the output value Vhc is outputted in the case of Fck/N≤Fns<Fck/M, in such a manner that the minimum measurement value Vhd' curves like an envelope. In other words, the output value Vhc may have such a waveform that is shaped like an envelope including the minimum measurement value Vhd' extended for a period of k·Tck in contrast with the measurement value Vfo.

Meanwhile, simply from the viewpoint of a filter, shaping the output value Vhc into the envelope is not advantageous to the digital filter 5 according to the third embodiment. However, since the output value Vhc is used for the clock frequency control, the envelope shape provides higher frequency control effects, for example, in a case where the clock frequency control is performed when Fck/M and 1/(8Td) become close to each other.

Figure 24:
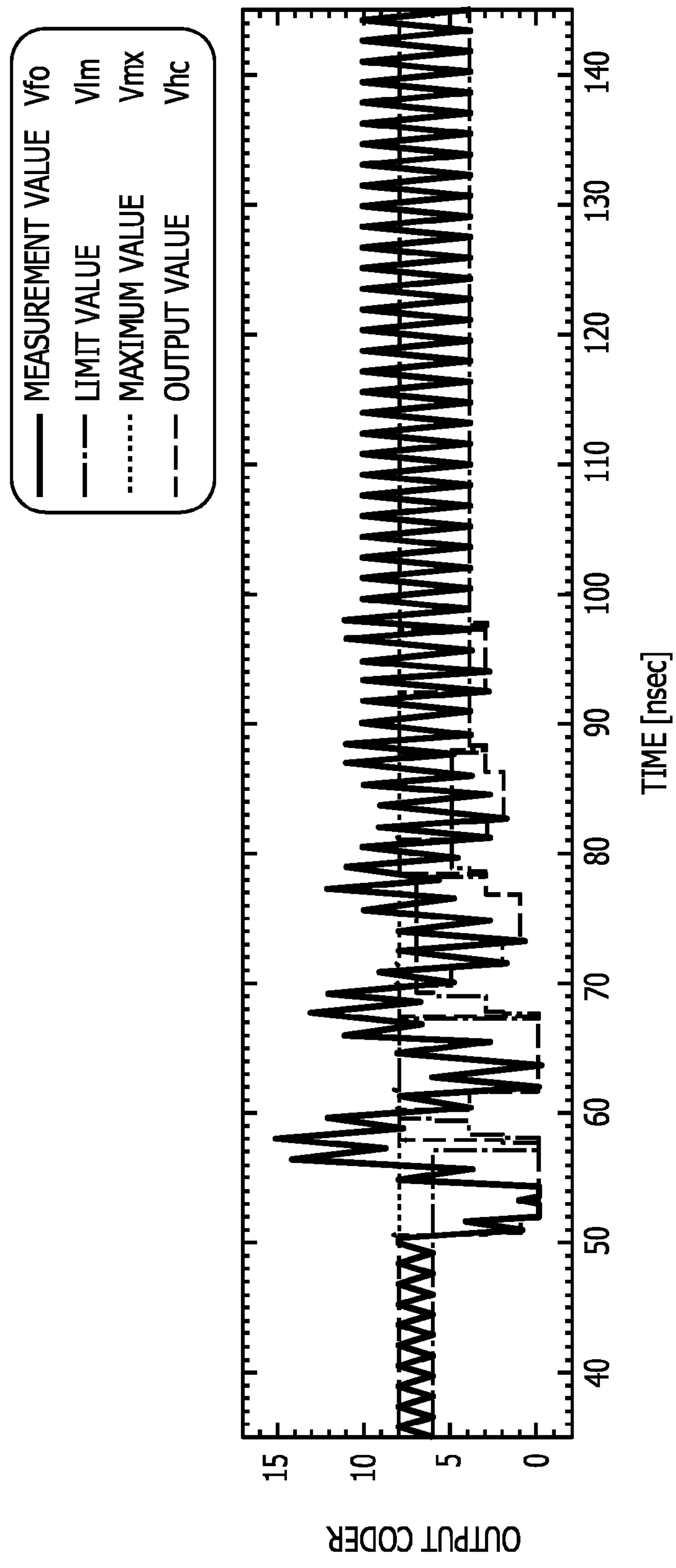
FIG. 24 is a graph illustrating a simulation result in the operation of the digital filter illustrated in FIG. 22.

FIG. 24 is a graph illustrating a simulation result in the operation of the digital filter illustrated in FIG. 22. Like FIG. 15 described above, the power supply is subjected to the small-amplitude voltage fluctuations of the frequency component satisfying Fns≥Fck/M and the large-amplitude first droop noise as being the frequency component satisfying Fck/4N<Fns<Fck/M.

As illustrated in FIG. 24, the digital filter according to the third embodiment generates such an output value Vhc that curves like the envelope of the minimum value of the measurement value Vfo, thus enabling the clock frequency control to be preferably performed when Fck/M and 1/(8Td) become close to each other. Note that in the simulation result in FIG. 24, a value "8" of the output code corresponds to the value "0" of the output code in FIGS. 11 to 14, 20, and 23.

Figure 25:
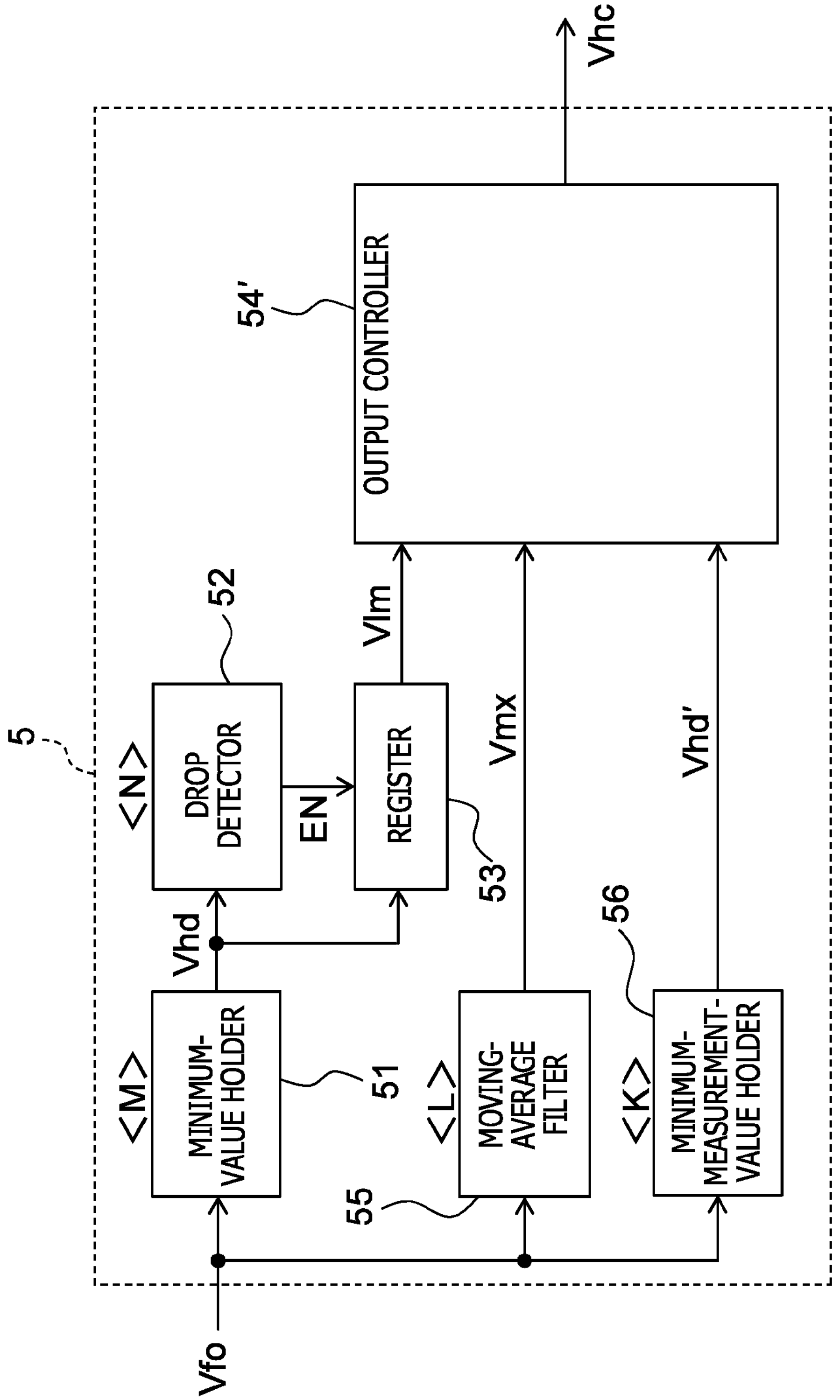
FIG. 25 is a block diagram illustrating a digital filter according to a fourth embodiment.

FIG. 25 is a block diagram illustrating a digital filter according to the fourth embodiment. A digital filter 5 according to the fourth embodiment corresponds to a digital filter obtained by combining the second embodiment and the third embodiment described above.

In the digital filter 5 according to the fourth embodiment, the moving-average filter 55 and the minimum-measurement-value holder 56 are added to the digital filter according to the first embodiment illustrated in FIG. 9.

The output controller 54' compares the minimum measurement value Vhd' with the limit value Vlm in the same manner as in the third embodiment. If Vhd'<Vlm holds true, the output controller 54' outputs the measurement value Vfo as the output value Vhc to the DCO 23. If Vhd'≥Vlm holds true, the output controller 54' outputs the maximum value Vmx as the output value Vhc to the DCO 23. The digital filter according to the fourth embodiment exerts the advantageous effects exerted in both the second embodiment and the third embodiment.

Figure 26:
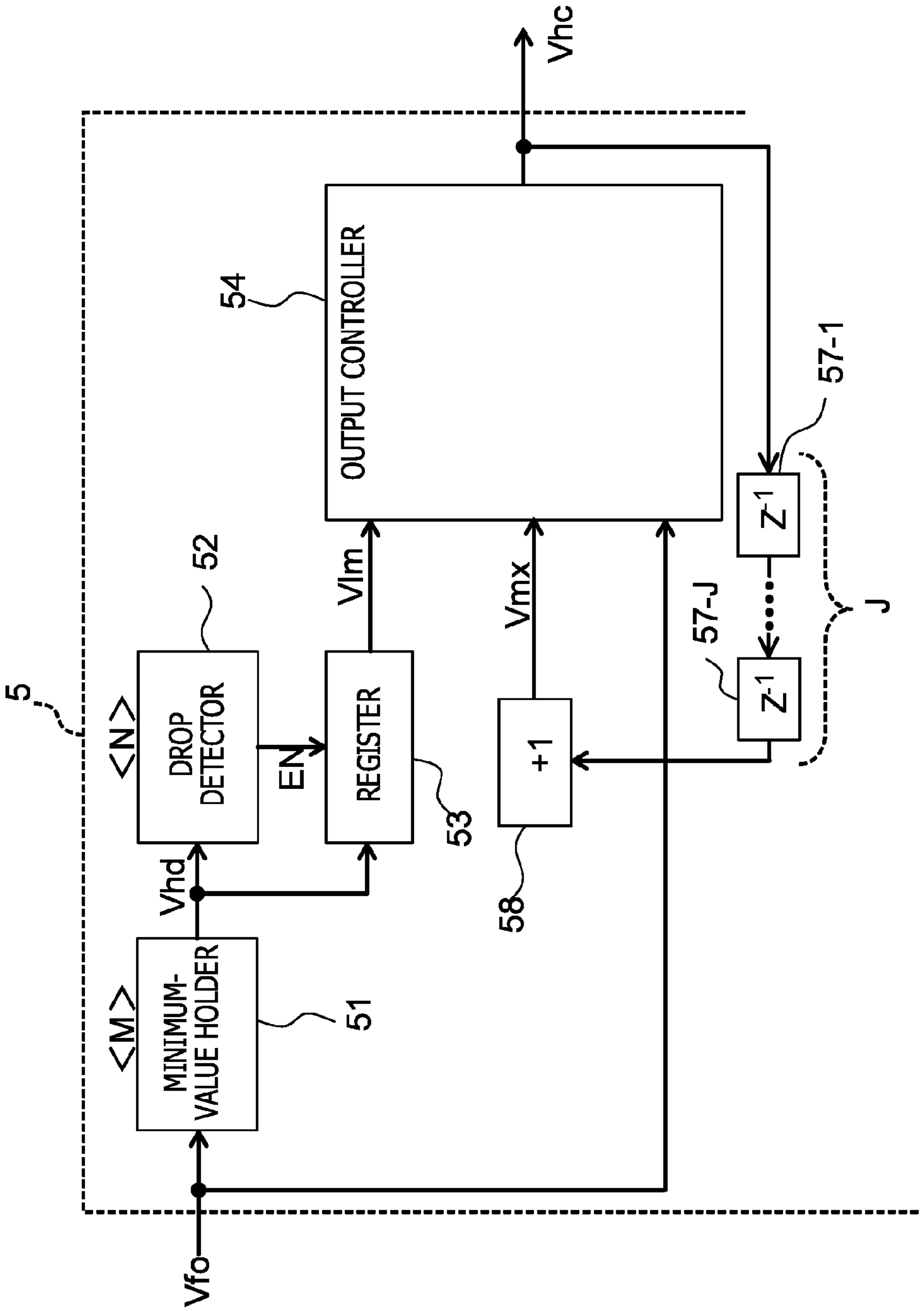
FIG. 26 is a block diagram illustrating a digital filter according to a fifth embodiment.

FIG. 26 is a block diagram illustrating a digital filter according to the fifth embodiment. As is clear from a comparison between FIG. 26 and FIG. 9 described above, a digital filter 5 according to the fifth embodiment corresponds to a digital filter in which J pieces of delay elements 57-1 to 57-J and a 1-adder 58 that adds only "1" to a processing target are added to the digital filter according to the first embodiment.

The digital filter 5 according to the fifth embodiment is designed to obtain a maximum value Vmx resulting from addition of "1" to an output value Vhc that is 3 cycles earlier. Specifically, when a relation between the measurement value Vfo and the limit value Vlm changes from Vfo<Vlm to Vfo≥Vlm, the output value Vhc changes from the measurement value Vfo to the maximum value Vmx in just one cycle.

Even in a case where there is a large difference between the output value Vhc and the maximum value Vmx, the output value Vhc changes at once in one cycle. To make the output value Vhc change gently, an increment of the output value Vhc is restricted in such a manner that an output value from the delay elements 57-1 to 57-J that is J cycles earlier is incremented by only "1" by the 1-adder 58. Although the configuration itself in the fifth embodiment does not contribute to characteristics of the digital filter, the configuration enables enhancement of the advantageous effects of the clock frequency control.

Figure 27:
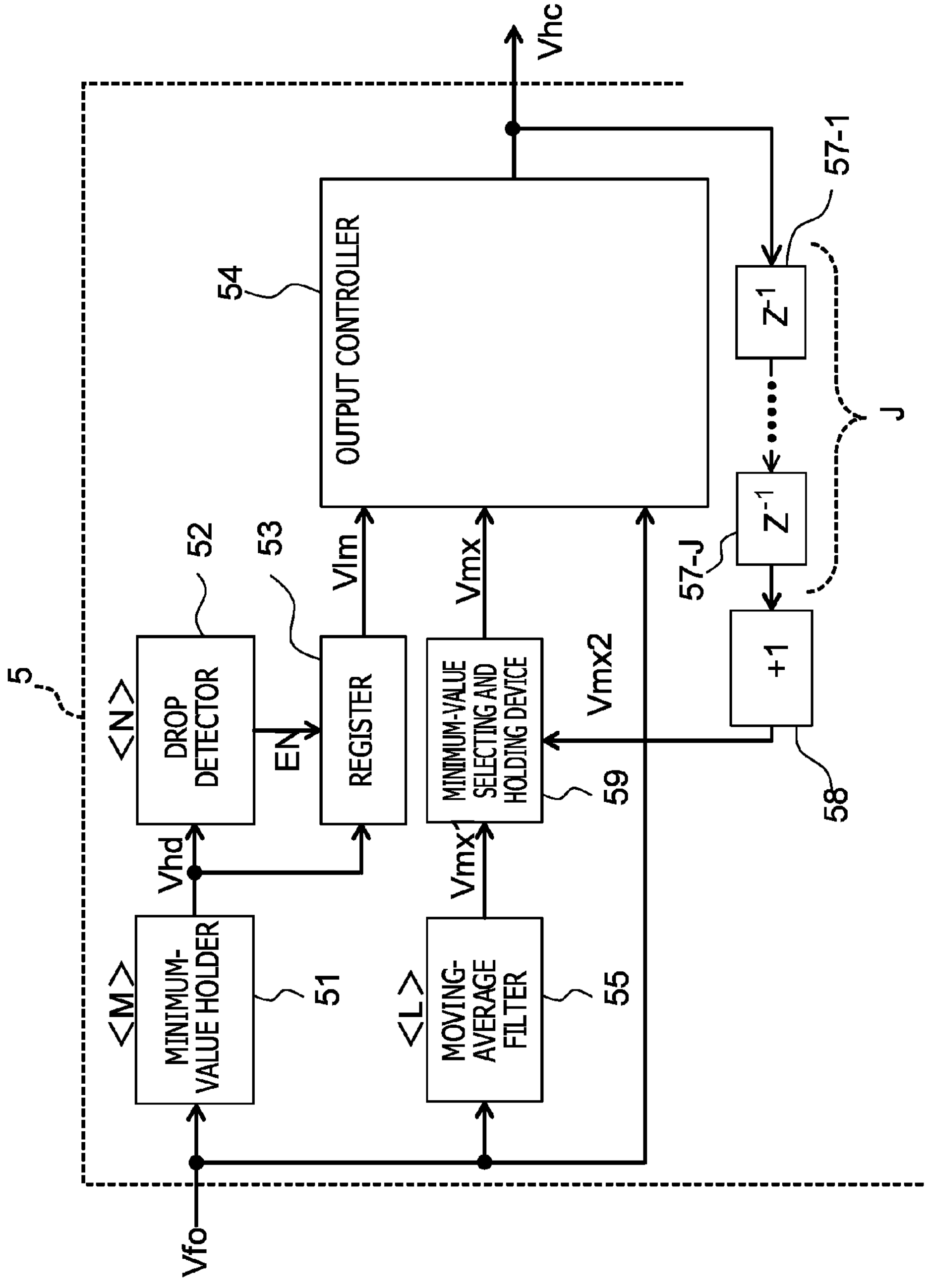
FIG. 27 is a block diagram illustrating a digital filter according to a sixth embodiment.

FIG. 27 is a block diagram illustrating a digital filter according to the sixth embodiment, and corresponds to a combination of the second embodiment described with reference to FIG. 19 and the fifth embodiment described with reference to FIG. 26.

As illustrated in FIG. 27, in the digital filter according to the sixth embodiment, a minimum-value selecting and holding device 59 receives output from the moving-average filter (a first-maximum-value generator) 55 in FIG. 19 as a first maximum value Vmx1 as well as output from the 1-adder (a second-maximum-value generator) 58 in FIG. 26 as a second maximum value Vmx2. The delay elements 57-1 to 57-J and the 1-adder 58 form the second-maximum-value generator.

The minimum-value selecting and holding device 59 selects a smaller one of the first maximum value Vmx1 and the second maximum value Vmx2 as a maximum value Vmx, and outputs the selected one to the output controller 54. As in the fifth embodiment, the digital filter according to the sixth embodiment enables enhancement of the advantageous effects of the clock frequency control in addition to the advantageous effects in the second embodiment described above.

Figure 28:
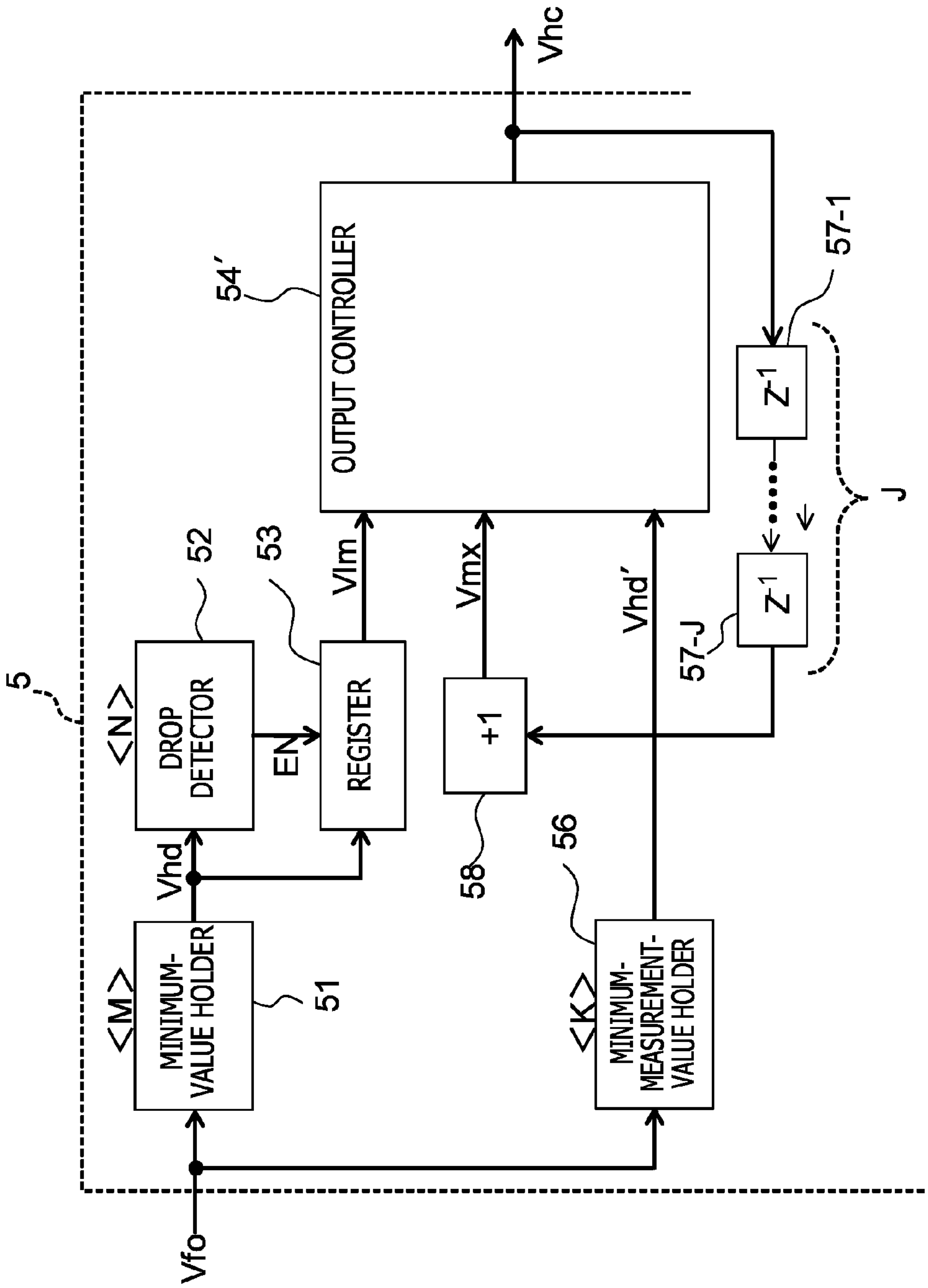
FIG. 28 is a block diagram illustrating a digital filter according to a seventh embodiment.

FIG. 28 is a block diagram illustrating a digital filter according to the seventh embodiment, and corresponds to a combination of the third embodiment described with reference to FIG. 22 and the fifth embodiment described with reference to FIG. 26.

As in the fifth embodiment, the digital filter according to the seventh embodiment enables enhancement of the advantageous effects of the clock frequency control in addition to the advantageous effects in the third embodiment described above.

Figure 29:
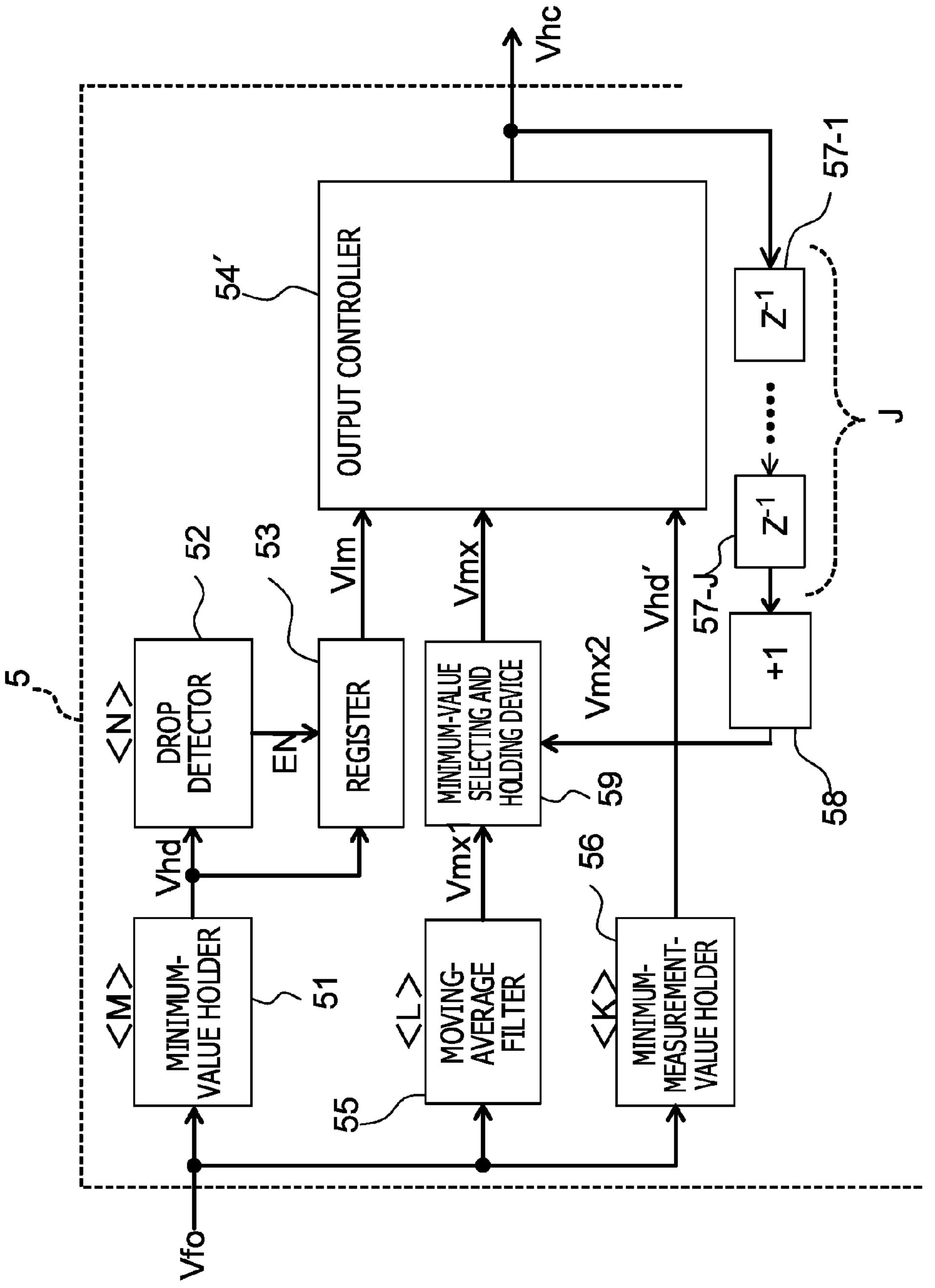
FIG. 29 is a block diagram illustrating a digital filter according to an eighth embodiment.

FIG. 29 is a block diagram illustrating a digital filter according to the eighth embodiment, and corresponds to a combination of the sixth embodiment described with reference to FIG. 27 and the third embodiment described with reference to FIG. 22, that is, a combination of the second, third, and fifth embodiments.

As in the fifth embodiment, the digital filter according to the eighth embodiment enables enhancement of the advantageous effects of the clock frequency control in addition to the advantageous effects in the second and third embodiments described above.

Note that the foregoing digital filters according to the first to eighth embodiments are merely examples. It goes without saying that various variations and modifications may be made.

Figure 30:
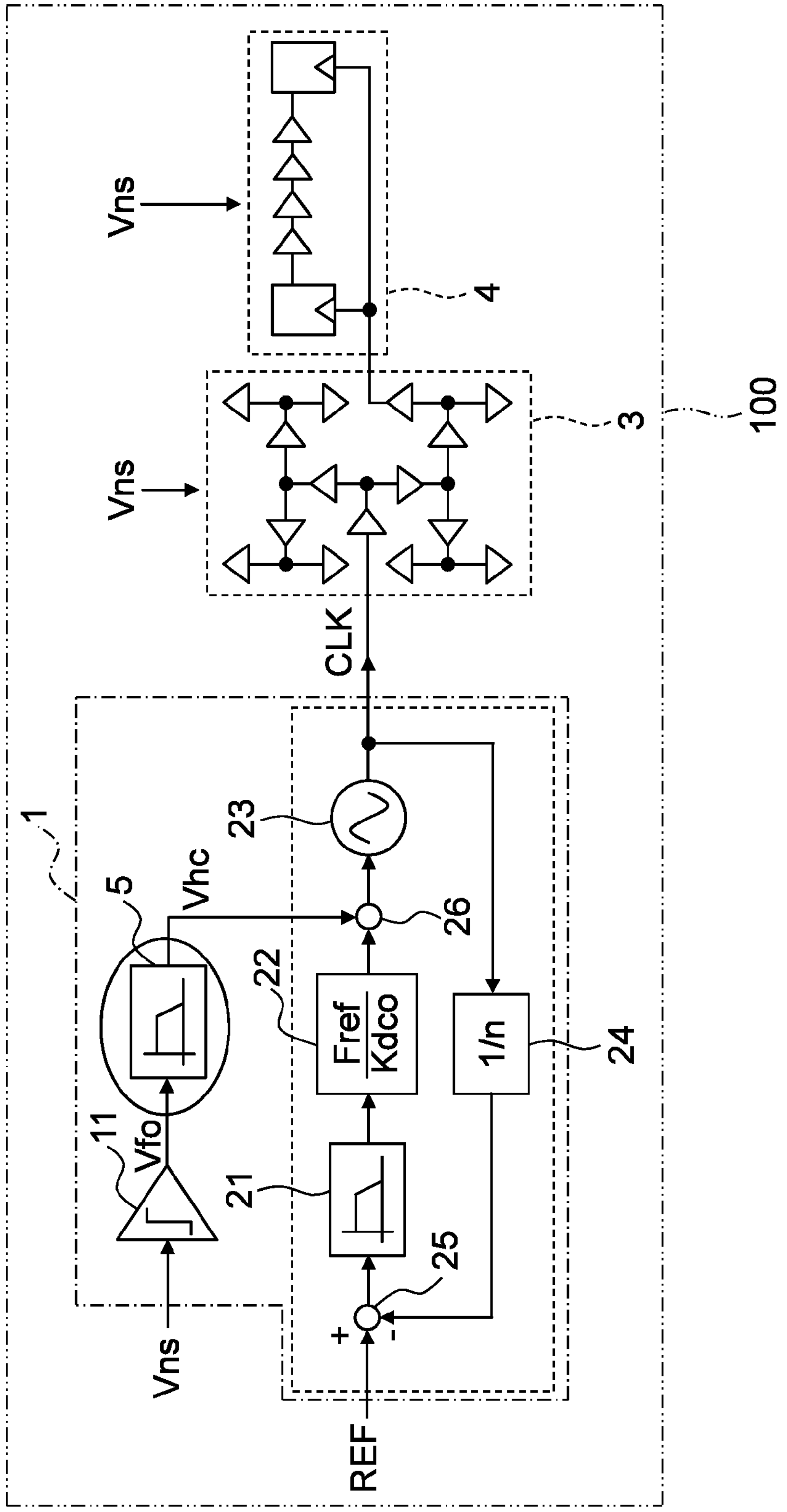
FIG. 30 is a diagram (1/3) for explaining clock frequency control performed in a case where the digital filter according to the eighth embodiment removes simultaneous switching noise.

FIGS. 30 to 32B are a diagram and graphs for explaining the clock frequency control performed in a case where the digital filter according to the eighth embodiment removes simultaneous switching noise. FIG. 30 corresponds to FIG. 16 described above, FIG. 31A corresponds to FIG. 17A described above, and FIG. 32A corresponds to FIG. 18A described above.

A digital filter 5 according to the eighth embodiment is provided between the voltage-fluctuation observer 11 and the adder 26, and is designed to process a measurement value Vfo from the voltage-fluctuation observer 11 and to output an output value Vhc to the adder 26. The same holds true for the digital filters according to the other embodiments.

Figure 31A:
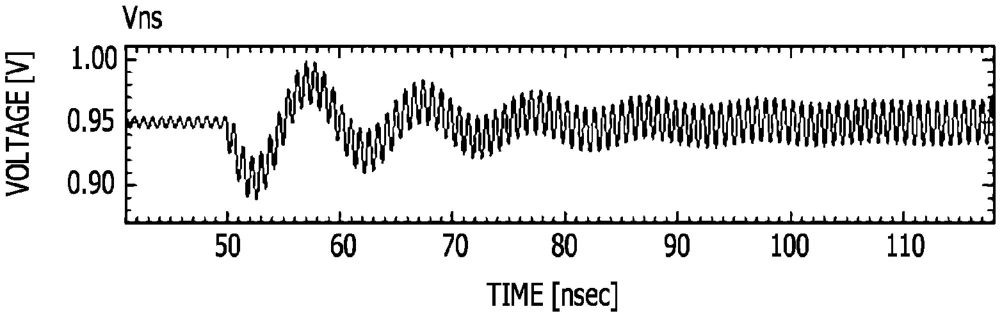
FIGS. 31A and 31B are graphs (2/3) for explaining the clock frequency control performed in the case where the digital filter according to the eighth embodiment removes the simultaneous switching noise.
Figure 31B:
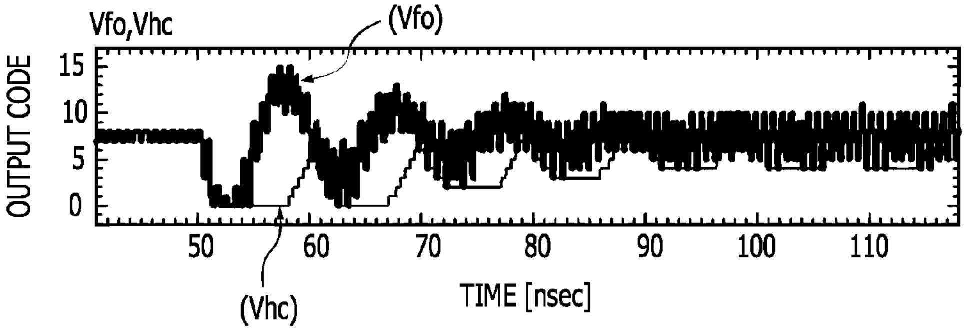

As is clear from a comparison between FIG. 31B and FIG. 17B described above, the digital filter according to the eighth embodiment enables removal of high frequency components further than in the first embodiment and enables obtaining an output value Vhc that is made not to change sharply.

It is understood that the eighth embodiment enables output, based on the measurement value Vfo, of the output value Vhc leading to easier voltage fluctuation compensation in the clock frequency control than in the first embodiment.

Figure 32A:
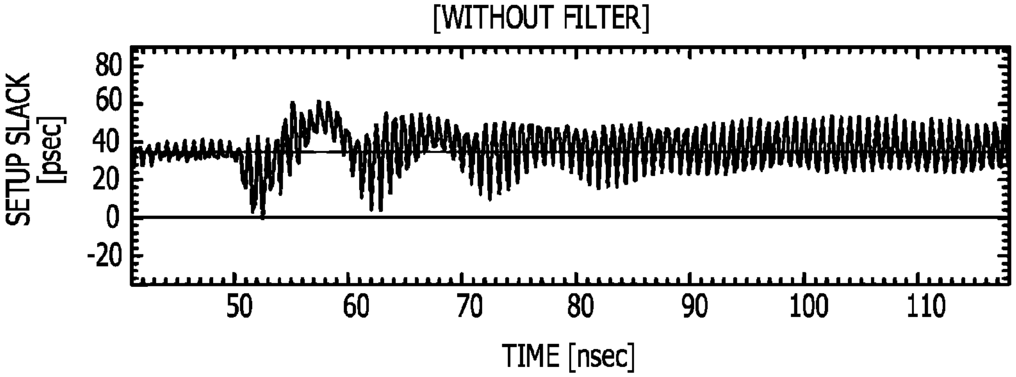
FIGS. 32A and 32B are graphs (3/3) for explaining the clock frequency control performed in the case where the digital filter according to the eighth embodiment removes the simultaneous switching noise.
Figure 32B:
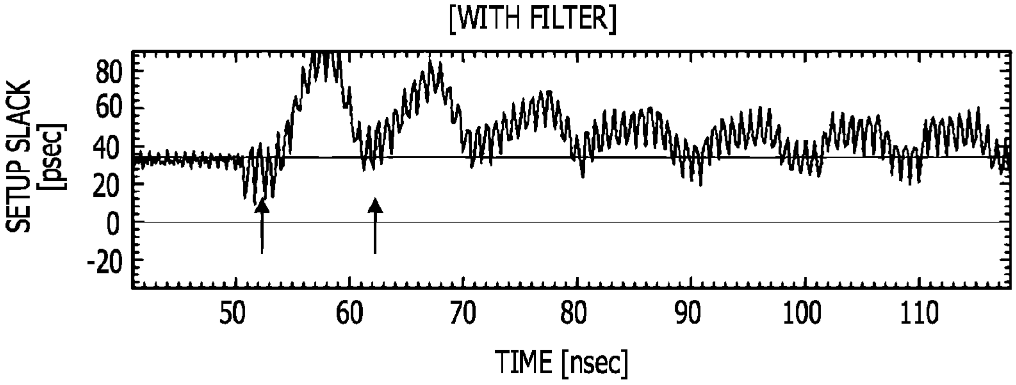

Further, as is clear from a comparison between FIG. 32B and FIG. 18B described above, the digital filter according to the eighth embodiment further enhances the advantageous effects of the clock frequency control in addition to the advantageous effects in the first embodiment. In other words, it is understood that the setup-slack worst-value parts indicated by the arrows in FIG. 32B have been improved.

In the foregoing embodiments, for example, M cycles for the minimum-value holder 51, the N cycles for the drop detector 52, the K cycles for the minimum-measurement-value holder 56, the L cycles for the moving-average filter 55, the J cycles for the delay elements 57-1 to 57-J, and the like may have various set values.

Further, to perform the clock frequency control appropriately, the frequency band of the voltage fluctuations to be reduced by the digital filters according to the embodiments is not limited to the first droop noise based on the resonance frequency of the semiconductor integrated circuit package.

Moreover, it goes without saying that the voltage-fluctuation frequency band in which the disadvantage of the clock frequency control is avoidable is not limited to tens of MHz to hundreds of MHz corresponding to the first droop noise.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A digital filter comprising:

a minimum-value holder that holds a minimum value of a measurement value inputted in the minimum-value holder and that outputs the minimum value as a held value;

a limit-value circuit that receives the held value and that outputs the held value as a limit value in a case where the held value remains minimum during predetermined cycles;

an output controller that receives a maximum value, the measurement value, and the limit value, the maximum value defining an upper limit, outputs the measurement value as an output value if the measurement value is smaller than the limit value, and outputs the maximum value as the output value if the measurement value is equal to or larger than the limit value;

a first-maximum-value generator including a moving-average filter that receives the measurement value and generates a first maximum value by taking a moving average of the measurement value in L cycles;

a second-maximum-value generator that receives the output value, delays the output value in J cycles, and generates a second maximum value by adding 1 to the delayed output value; and a minimum-value selecting and holding device that outputs a smaller one of the first maximum value and the second maximum value, as the maximum value.

2. The digital filter according to claim 1, wherein the limit-value circuit includes a drop detector that receives the held value and outputs an enable signal in a case where the held value remains minimum during N cycles, and a register that receives the held value and, based on the enable signal, acquires and outputs the held value as the limit value.

3. The digital filter according to claim 1, further comprising:

a maximum-value generator that receives the measurement value and generates the maximum value by taking a moving average of the measurement value in L cycles.

4. The digital filter according to claim 1, further comprising:

a maximum-value generator that receives the output value, delays the output value in J cycles, and generates the maximum value by adding 1 to the delayed output value.

5. The digital filter according to claim 1, wherein the measurement value is output from a voltage-fluctuation observer that observes voltage fluctuations.

6. A timing signal generation circuit comprising:

a voltage-fluctuation observer that receives an input voltage to measure voltage fluctuations and outputs a measurement value of the voltage fluctuations;

a digital filter that receives the measurement value from the voltage-fluctuation observer, the digital filter including a minimum-value holder that holds a minimum value of a measurement value inputted in the minimum-value holder and that outputs the minimum value as a held value, a limit-value circuit that receives the held value and that outputs the held value as a limit value in a case where the held value remains minimum during predetermined cycles, a minimum-measurement-value holder that receives the measurement value, holds a minimum value of the measurement value, and outputs a minimum measurement value; and an output controller that receives a maximum value, the measurement value, and the limit value, the maximum value defining an upper limit, outputs the minimum measurement value as an output value if the minimum measurement value is smaller than the limit value, and outputs the maximum value as the output value if the minimum measurement value is equal to or larger than the limit value;

a first-maximum-value generator including a moving-average filter that receives the measurement value and generates a first maximum value by taking a moving average of the measurement value in L cycles;

a second-maximum-value generator that receives the output value, delays the output value in J cycles, and generates a second maximum value by adding 1 to the delayed output value; and a minimum-value selecting and holding device that outputs a smaller one of the first maximum value and the second maximum value, as the maximum value, a PLL that performs frequency control on a timing signal to be outputted, based on the output value from the digital filter.

7. The timing signal generation circuit according to claim 6, wherein the PLL includes an adder that adds the output value from the digital filter to output from a gain normalizer, and a digital controlled oscillator that generates the timing signal having an oscillation frequency based on output from the adder, and the PLL performs the frequency control on the timing signal, based on the output value from the digital filter.

8. The timing signal generation circuit according to claim 7, wherein the PLL further includes a divider that divides the timing signal, a subtractor that subtracts output from the divider from a reference signal, and a loop filter that cuts off fluctuations in short cycles from output from the subtractor, and the gain normalizer receives output from the loop filter and normalizes the output.

9. A digital filter comprising:

a minimum-value holder that holds a minimum value of a measurement value inputted in the minimum-value holder and that outputs the minimum value as a held value;

a limit-value circuit that receives the held value and that outputs the held value as a limit value in a case where the held value remains minimum during predetermined cycles;

a minimum-measurement-value holder that receives the measurement value, holds a minimum value of the measurement value, and outputs a minimum measurement value;

an output controller that receives a maximum value, the minimum measurement value, and the limit value, the maximum value defining an upper limit, outputs the minimum measurement value as an output value if the minimum measurement value is smaller than the limit value, and outputs the maximum value as the output value if the minimum measurement value is equal to or larger than the limit value;

a first-maximum-value generator including a moving-average filter that receives the measurement value and generates a first maximum value by taking a moving average of the measurement value in L cycles;

a second-maximum-value generator that receives the output value, delays the output value in J cycles, and generates a second maximum value by adding 1 to the delayed output value; and a minimum-value selecting and holding device that outputs a smaller one of the first maximum value and the second maximum value, as the maximum value.

10. The digital filter according to claim 9, wherein the limit-value circuit includes a drop detector that receives the held value and outputs an enable signal in a case where the held value remains minimum during N cycles, and a register that receives the held value and, based on the enable signal, acquires and outputs the held value as the limit value.

11. The digital filter according to claim 9, wherein the minimum-value holder receives the measurement value, holds a minimum value of the measurement value received during cycles the number of which is M, and outputs the minimum value as the held value, the minimum-measurement-value holder receives the measurement value, holds a minimum value of the measurement value received during cycles the number of which is K, and outputs the minimum value as the minimum measurement value, and the M and the K has a relation $M \leq K \leq 4M$.

12. The digital filter according to claim 9, further comprising:

a maximum-value generator that receives the measurement value and generates the maximum value by taking a moving average of the measurement value in L cycles.

13. The digital filter according to claim 9, further comprising:

a maximum-value generator that receives the output value, delays the output value in J cycles, and generates the maximum value by adding 1 to the delayed output value.

14. The digital filter according to claim 9, wherein the measurement value is output from a voltage-fluctuation observer that observes voltage fluctuations.

* * * * *